United States Patent
Sprague et al.

(10) Patent No.: US 7,050,456 B1
(45) Date of Patent: May 23, 2006

(54) METHODS AND SYSTEMS FOR COMMUNICATING SIGNALING SYSTEM 7 (SS7) USER PART MESSAGES AMONG SS7 SIGNALING POINTS (SPS) AND INTERNET PROTOCOL (IP) NODES USING SIGNAL TRANSFER POINTS (STPS)

(75) Inventors: David Michael Sprague, Raleigh, NC (US); Dan Alan Brendes, Raleigh, NC (US); Venkatarmaiah Ravishankar, Apex, NC (US); Paul Andrew Miller, Raleigh, NC (US)

(73) Assignee: Tekelec, Calabasas, CA (US)

( * ) Notice: Subject to any disclaimer, the term of this patent is extended or adjusted under 35 U.S.C. 154(b) by 0 days.

(21) Appl. No.: 09/443,712

(22) Filed: Nov. 19, 1999

Related U.S. Application Data

(63) Continuation-in-part of application No. 09/205,809, filed on Dec. 4, 1998, now Pat. No. 6,324,183.

(60) Provisional application No. 60/127,889, filed on Apr. 5, 1999, provisional application No. 60/137,988, filed on Jun. 7, 1999.

(51) Int. Cl.
*H04J 3/22* (2006.01)

(52) U.S. Cl. ................ 370/467; 370/392; 370/469

(58) Field of Classification Search ........... 370/473, 370/474, 475, 352, 467, 466, 465, 395.63, 370/394, 392, 393, 382, 354, 401, 410, 469; 379/228, 230, 229

See application file for complete search history.

(56) References Cited

U.S. PATENT DOCUMENTS

| | | | |
|---|---|---|---|
| 5,008,929 A | | 4/1991 | Olsen et al. |
| 5,142,622 A | | 8/1992 | Owens |
| 5,173,897 A | * | 12/1992 | Schrodi et al. ............. 370/394 |
| 5,208,811 A | | 5/1993 | Kashio et al. |
| 5,239,542 A | | 8/1993 | Breidenstein et al. |
| 5,315,641 A | | 5/1994 | Montgomery et al. |
| 5,384,840 A | | 1/1995 | Blatchford et al. |
| 5,420,916 A | | 5/1995 | Sekiguchi |
| 5,430,727 A | | 7/1995 | Callon |
| 5,509,010 A | | 4/1996 | La Porta et al. |
| 5,568,487 A | | 10/1996 | Sitbon et al. |
| 5,581,558 A | | 12/1996 | Horney, II et al. |
| 5,583,927 A | | 12/1996 | Ely et al. |

(Continued)

FOREIGN PATENT DOCUMENTS

EP 0 853 411 A2 7/1998

(Continued)

OTHER PUBLICATIONS

Henry Mfg. Co. Inc. v. Commercial Filters Corp, 350 F.Supp. 1015 (S.D. Indiana 1971).*

(Continued)

*Primary Examiner*—Hassan Kizou
*Assistant Examiner*—Saba Tsegaye
(74) *Attorney, Agent, or Firm*—Jenkins, Wilson, Taylor Hunt, P.A.

(57) ABSTRACT

Methods and systems for transmitting user part messages between signaling system seven (SS7) signaling points over an internet protocol (IP) network include receiving, at a signal transfer point, a first SS7 user part message. The first SS7 user part message can be received from a first SS7 signaling point, such as a service switching point (SSP). The first SS7 signaling point is encapsulated in a first IP packet. The first IP packet is transmitted to a second SS7 signaling point over an IP network.

36 Claims, 18 Drawing Sheets

U.S. PATENT DOCUMENTS

| | | | |
|---|---|---|---|
| 5,586,177 A | 12/1996 | Farris et al. | |
| 5,592,530 A | 1/1997 | Brockman et al. | |
| 5,638,431 A | 6/1997 | Everett et al. | |
| 5,640,446 A | 6/1997 | Everett et al. | |
| 5,651,002 A | 7/1997 | Van Seters et al. | |
| 5,657,452 A | 8/1997 | Kralowetz et al. | |
| 5,664,102 A | 9/1997 | Faynberg | |
| 5,675,635 A | 10/1997 | Vos et al. | |
| 5,680,552 A | 10/1997 | Netravali et al. | |
| 5,696,809 A | 12/1997 | Voit | |
| 5,701,301 A | 12/1997 | Weisser, Jr. | |
| 5,706,286 A | 1/1998 | Reiman et al. | |
| 5,712,903 A | 1/1998 | Bartholomew et al. | |
| 5,732,213 A | 3/1998 | Gessel et al. | |
| 5,740,374 A | 4/1998 | Raffali-Schreinemachers | |
| 5,761,281 A | 6/1998 | Baum et al. | |
| 5,761,290 A | 6/1998 | Farris et al. | |
| 5,761,500 A | 6/1998 | Gallant et al. | |
| 5,764,750 A | 6/1998 | Chau et al. | |
| 5,764,955 A | 6/1998 | Doolan | |
| 5,768,361 A | 6/1998 | Cowgill | |
| 5,768,525 A | 6/1998 | Kralowetz et al. | |
| 5,774,695 A * | 6/1998 | Autrey et al. | 703/26 |
| 5,781,534 A | 7/1998 | Perlman et al. | |
| 5,787,255 A | 7/1998 | Parlan et al. | |
| 5,793,771 A | 8/1998 | Darland et al. | |
| 5,802,285 A | 9/1998 | Hirviniemi | |
| 5,805,587 A | 9/1998 | Norris et al. | |
| 5,809,028 A | 9/1998 | Nethercott et al. | |
| 5,812,781 A | 9/1998 | Fahlman et al. | |
| 5,815,669 A | 9/1998 | Lee et al. | |
| 5,828,844 A | 10/1998 | Civanlar et al. | |
| 5,838,782 A | 11/1998 | Lindquist | |
| 5,852,660 A | 12/1998 | Lindquist et al. | |
| 5,867,495 A | 2/1999 | Elliott et al. | |
| 5,870,565 A | 2/1999 | Glitho | |
| 5,872,782 A | 2/1999 | Dendi | |
| 5,878,129 A | 3/1999 | Figurski et al. | |
| 5,889,954 A | 3/1999 | Gessel et al. | |
| 5,892,822 A | 4/1999 | Gottlieb et al. | |
| 5,898,667 A | 4/1999 | Longfield et al. | |
| 5,912,887 A | 6/1999 | Sehgal | |
| 5,917,900 A | 6/1999 | Allison et al. | |
| 5,920,562 A | 7/1999 | Christie et al. | |
| 5,923,659 A * | 7/1999 | Curry et al. | 370/401 |
| 5,926,482 A | 7/1999 | Christie et al. | |
| 5,940,598 A | 8/1999 | Strauss et al. | |
| 5,949,871 A | 9/1999 | Kabay et al. | |
| 5,958,016 A | 9/1999 | Chang et al. | |
| 5,966,431 A | 10/1999 | Reiman et al. | |
| 5,974,052 A | 10/1999 | Johnson et al. | |
| 5,991,301 A | 11/1999 | Christie et al. | |
| 5,995,608 A | 11/1999 | Detampel, Jr. et al. | |
| 6,006,098 A | 12/1999 | Rathnasabapathy et al. | |
| 6,011,780 A | 1/2000 | Vaman et al. | |
| 6,011,794 A | 1/2000 | Mordowitz et al. | |
| 6,011,803 A | 1/2000 | Bicknell et al. | |
| 6,014,379 A | 1/2000 | White et al. | |
| 6,018,515 A | 1/2000 | Sorber | |
| 6,021,126 A | 2/2000 | White et al. | |
| 6,023,502 A | 2/2000 | Bouanaka et al. | |
| 6,026,091 A | 2/2000 | Christie et al. | |
| 6,047,005 A | 4/2000 | Sherman et al. | |
| 6,055,202 A | 4/2000 | Merritt | |
| 6,064,653 A | 5/2000 | Farris | |
| 6,067,546 A | 5/2000 | Lund | |
| 6,069,890 A | 5/2000 | White et al. | |
| 6,075,783 A | 6/2000 | Voit | |
| 6,078,582 A | 6/2000 | Curry et al. | |
| 6,079,036 A | 6/2000 | Moharram | |
| 6,084,892 A | 7/2000 | Benash et al. | |
| 6,084,956 A | 7/2000 | Turner et al. | |
| 6,094,437 A | 7/2000 | Loehndorf, Jr. et al. | |
| 6,097,719 A | 8/2000 | Benash et al. | |
| 6,097,805 A | 8/2000 | Figurski et al. | |
| 6,111,870 A | 8/2000 | Kurtz | |
| 6,111,893 A | 8/2000 | Volftsun et al. | |
| 6,112,090 A | 8/2000 | Valentine | |
| 6,115,383 A | 9/2000 | Bell et al. | |
| 6,118,779 A | 9/2000 | Madonna | |
| 6,118,780 A | 9/2000 | Dunn et al. | |
| 6,119,160 A | 9/2000 | Zhang et al. | |
| 6,122,255 A | 9/2000 | Bartholomew et al. | |
| 6,122,263 A | 9/2000 | Dahlin et al. | |
| 6,122,365 A | 9/2000 | Yegoshin | |
| 6,125,111 A | 9/2000 | Snow et al. | |
| 6,125,177 A | 9/2000 | Whittaker | |
| H1880 H | 10/2000 | Vines et al. | |
| H1896 H | 10/2000 | Hoffpauir et al. | |
| 6,128,379 A | 10/2000 | Smyk | |
| 6,134,235 A | 10/2000 | Goldman et al. | |
| 6,134,246 A | 10/2000 | Cai et al. | |
| 6,137,869 A | 10/2000 | Voit et al. | |
| 6,137,874 A | 10/2000 | Brown et al. | |
| 6,144,667 A | 11/2000 | Doshi et al. | |
| 6,144,670 A | 11/2000 | Sponaugle et al. | |
| 6,151,390 A | 11/2000 | Volftsun et al. | |
| 6,154,467 A | 11/2000 | Hager et al. | |
| 6,157,710 A | 12/2000 | Figurski et al. | |
| 6,178,181 B1 * | 1/2001 | Glitho | 370/467 |
| 6,195,425 B1 | 2/2001 | Farris | |
| 6,201,804 B1 | 3/2001 | Kikinis | |
| 6,215,783 B1 | 4/2001 | Neyman | |
| 6,236,722 B1 | 5/2001 | Gilbert et al. | |
| 6,307,926 B1 | 10/2001 | Barton et al. | |
| 6,314,290 B1 * | 11/2001 | Joshi et al. | 455/427 |
| 6,327,267 B1 * | 12/2001 | Valentine et al. | 370/466 |
| 6,327,350 B1 * | 12/2001 | Spangler et al. | 379/115.01 |
| 6,385,301 B1 * | 5/2002 | Nolting et al. | 379/32.01 |
| 6,393,022 B1 | 5/2002 | Hewett et al. | |
| 6,411,632 B1 * | 6/2002 | Lindgren et al. | 370/466 |
| 6,507,649 B1 * | 1/2003 | Tovander | 379/230 |
| 6,529,524 B1 | 3/2003 | Liao et al. | |
| 6,553,427 B1 | 4/2003 | Chang et al. | |
| 6,584,190 B1 | 6/2003 | Bressler | |
| 6,594,246 B1 | 7/2003 | Jorgensen | |
| 6,611,533 B1 | 8/2003 | Liao et al. | |
| 6,678,242 B1 | 1/2004 | Simon | |

FOREIGN PATENT DOCUMENTS

| | | |
|---|---|---|
| EP | 1014735 | 12/1999 |
| EP | 1054568 | 5/2000 |
| EP | 1089575 | 9/2000 |
| WO | WO97/11563 | 3/1997 |
| WO | WO98/28885 | 7/1998 |
| WO | WO00/19758 | 4/2000 |
| WO | WO00/22840 | 4/2000 |
| WO | WO00/30369 | 5/2000 |
| WO | WO00/31933 | 6/2000 |
| WO | WO00/33519 | 6/2000 |
| WO | WO00/56032 | 9/2000 |
| WO | WO0054476 | 9/2000 |
| WO | WO0111825 | 2/2001 |
| WO | WO0124499 | 4/2001 |
| WO | WO01/37532 | 5/2001 |

OTHER PUBLICATIONS

Ex Parte Remark, 1990 WL 354512 (Bd.Pat.App. & Interf. 1990).*

"Eagle® Feature Guide," Publication PN/9110-1225-01, Rev. B, Tekelec (Jan., 1998).

"Eagle® STP Platform," Publication 908-0126-01, Rev. A, Tekelec (1997).
"Eagle® STP STP LAN Interface Feature," Publication 908-0134-01, Rev. B, Tekelec (1997).
"Eagle® Database Transport Access Feature," Publication 908-0136-01, Rev. B, Tekelec (1997).
"Eagle® STP X.25 to SS7-IS.41 Protocol Conversion Feature," Publication 908-0135-01, Rev. B, Tekelec (1997).
"Eagle® STP ANSI-ITU Gateway Feature," Publication 908-0133-01, Rev. B, Tekelec (1997).
"SS7-Frame Relay Access Device SS7 Protocol Information Translator," Publication 908-0167-01, Rev. A, Tekelec (1997).
O'Shea, "Telephony," Mating Season, p. 10-11, ( Sep. 20, 1999).
Lakshmi-Ratan, "The Lucent Technologies Softswitch-Realizing the Promise of Convergence," Bell Labs Technical Journal, p. 174-195, ( Apr. 5, 1999).
Hamdi et al., "Voice Service Interworking for PSTN and IP Networks," IEEE Communications Magazine, p. 104-111, ( Jun. 5, 1999).
O'Shea, "The Network that's Never Done," Telephony, p. 38-43, ( Sep. 15, 1997).
Snyder, "Rerouting Internet Traffic Jams," Telephony, p. 12, ( Nov. 11, 1996).
Snyder, "Branded with Optics," Telephony, p. 49-50, ( Jul. 22, 1996).
ANONYMOUS, "Around the Loop," Telephony, p. 26, ( Jul. 22, 1996).
Zaharychuk et al., "Gateway Signal Transfer Points: Design, Services and Benefits," IEEE, p. 223.2.1-223.2.8, ( Jun. 15, 1998).
Bootman et al., "Generic Building Blocks for the Telecommunications Management Network," IEEE, p. 6.1.1-6.1.5, ( Jun. 15, 1988).
Bootman, "Intelligent Network Services Using a Service Switching Node," IEEE, p. 40.7.1-40.2.4, ( Jun. 15, 1988).
Buckles, "Intelligent Network Services Using a Service Switching Node," IEEE, p. 40.2.1-40.2.4, ( Jun. 15, 1988).
Michael McGrew, "Transport SS7 Signaling Over IP," Lucent Technologies Inc., p. 1-8, (Nov. 1998).
Official Action from the European Patent Office (Sep. 21, 2004).
Pai, "In-Building Wireless: The Next Generation," TelephonyOnline.com, pp. 1-4 (Jun. 30, 2004).
Handa, "In Building Wireless: The Next Generation," TMCnet.com, pp. 1-7 (Feb. 12, 2004).
Fitchard, "A New Voice in the Boardroom," Wireless Review, pp. 1-3 (Sep. 1, 2003).
"Fixed Wireless Technology," ISP Planet, pp. 1-4 (May 14, 2002).
Martinek, "Office on the Fly," Wireless Review, pp. 1-4 (Jul. 15, 2001).

"March Networks 3300 Integrated Communications Platform," Mitel Networks Corporation, pp. 1-34 (Jul. 2001).
Swartz, "Ready, Set, Wireless Office!," Wireless Review, pp. 1-4 (Jun. 1, 2000).
"Telstra and Ericsson Trial Next Generation Wireless Office Solution," Ericsson, pp. 1-2 (Apr. 28, 2000).
"Mitel and Ericsson Join Forces to Deliver an Integrated Digital Wireless Office Solution with PBX Functionality-Company Business and Marketing," Cambridge Telcom Report, pp. 1-4 (Apr. 24, 2000).
"Market and Development Agreement Targets Customers Looking for Ways to Become More Productive Through Convenient and Cost-Effective Communication," Ericsson Press Release, pp. 1-2 (Apr. 4, 2000).
Sulkin, "Emerging Options for Wireless PBXs," Voice2000, pp. 1-8 (Feb. 2000).
Drzewianowski, "WLANs—For the Picking," Communications Solutions™ Next-Gen Networks, pp. 1-9 (Jan. 2000).
"The Wireless Business Connection," Second Quarter 2000 Report, The Phillips Group—Infotech, pp. 1-9 (2000).
"Corporate Offices to Go Wireless First Australian GSM on the Net Trial," Ericsson Press Release, pp. 1-3 (Aug. 11, 1999).
"Ericsson Solution Chosen for World's First Combined DECT/GSM Communications Service," Ericsson, pp. 1-9 (Jun. 21, 1999).
"Enterprise IP Gateway," Ericsson, pp. 1-6 (1999).
"The Ericsson IPT System," Ericsson, pp. 1-8 (1999).
"Wireless: Top Ericsson Executives Lay Out Corporate Vision, Unveil Strategy for the Enterprise Customer—Company Business and Marketing," EDGE, On & About AT&T, pp. 1-5, (Nov. 30, 1998).
"Ericsson Wireless Office Services to Provide Digital System Through AT&T Wireless Services," Ericsson Press Release, pp. 1-2 (Apr. 17, 1998).
Woods, "Fresno Bee Still Buzzing About Wireless," TechNews, pp. 1-2 (1995).
"TeleSys Announces the Compatibility of Ericsson's Mobile Advantage Wireless Office and teleSys' MACH7-IP Gateway," teleSys Software—Press Release, pp. 1-2 (Publication Date Unknown).
"Ericsson Announces General Availability of Its Mobile Advantage Wireless Office System," Ericsson Press Release, pp. 1-2 (Nov. 4, 1999).
Johanson et al., "Mobile Advantage Wireless Office—A Digital Wireless Office System for TDMA/136 Networks," Ericsson Review No. 1, pp. 20-27 (1999).
Official Action in U.S. Appl. No. 10/403,457 (May 6, 2004).

* cited by examiner

Regional STPs
"D" links
Local STPs

"A" links
"E" links

"A" links
"F" links

METHODS AND SYSTEMS FOR COMMUNICATING SIGNALING SYSTEM 7 (SS7) USER PART MESSAGES AMONG SS7 SIGNALING POINTS (SPS) AND INTERNET PROTOCOL (IP) NODES USING SIGNAL TRANSFER POINTS (STPS)

PRIORITY APPLICATION INFORMATION

This application is a continuation-in-part of U.S. patent application Ser. No. 09/205,809 filed Dec. 4, 1998 (U.S. Pat. No. 6,324,183) and further claims the benefit of U.S. Provisional Patent Application No. 60/127,889 filed Apr. 5, 1999, and U.S. Provisional Patent Application No. 60/137,988 filed Jun. 7, 1999, the disclosures of each of which are incorporated herein by reference in their entirety.

FIELD OF THE INVENTION

The present invention relates generally to methods and systems for communicating signaling system 7 (SS7) user part messages among SS7 nodes and internet protocol (IP) nodes. More particularly, the present invention relates to methods and systems for communicating SS7 user part messages among SS7 signaling points and IP nodes using signal transfer points (STPs).

BACKGROUND OF THE INVENTION

Modern telecommunications networks generally include two separate communication pathways or subnetworks. The first is a voice network that handles the transmission of voice or other information between users. The second is a signaling network that facilitates the dynamic linking of a plurality of voice network circuits, such that a voice-type connection is established between a calling party and a called party. These functions are generically referred to as call setup and call tear down. Additionally, the signaling network provides a framework through which non-voice related information can be transported in a manner that is transparent to the user. This signaling technique is often referred to as "out of band" signaling, where the term "band" implies voice band. Common examples of such out of band data transport are the access of 800 number database services, calling card verification services, number portability services, and caller ID services.

In order to provide consistent and reliable communication across the signaling network infrastructure, a common or standard digital signaling protocol known as SS7 has been developed. SS7 is an out of band common channel signaling system that uses labeled messages to transport circuit related signaling information, non-circuit related signaling information, network resident database service information and other information that can be used for the establishment of communication services.

From a hardware perspective, an SS7 network includes a plurality of SS7 nodes, generically referred to as signaling points (SPs), that are interconnected using signaling links, also referred to as SS7 links. At least three types of SPs are provided in an SS7 network: service switching points (SSPs), signal transfer points (STPs), and service control points (SCPs).

An SSP is normally installed in tandem or Class 5 offices. The SSP is capable of handling both in-band signaling and SS7 signaling. An SSP can be a customer switch, an end-office, an access tandem and/or a tandem. An STP transfers signaling messages from one signaling link to another. STPs are packet switches and are generally installed in mated pairs. Finally, SCPs control access to databases, such as 800 number translation databases, 800 number carrier identification databases, credit card verification databases, etc.

Signaling datalinks are transmission facilities used to connect SPs together. They are dedicated bidirectional facilities operating at 56 kbps in the U.S. and Canada and at 64 kbps when clear channel capability is deployed. Normally, every link has a mate for redundancy and enhanced network integrity.

Signaling datalinks include access links or "A" links that connect SSPs to STPs and that connect SCPs to STPs, as shown in FIG. 1. Bridge links or "B" links are used to connect mated STPs to other mated STPs that are at the same hierarchical level, as shown in FIG. 2. Cross links or "C" links connect mated STPs together, as shown in FIG. 3. C links are used for passing messages between STPs when signaling network failures are encountered.

Diagonal links or "D" links connect STPs of different hierarchical levels, as shown in FIG. 4. Extended links or "E" links connect SSPs to STPs that are not within their associated local STP area, as shown in FIG. 5. Finally, fully associated links or "F" links connect SSPs directly together without STPs, as shown in FIG. 6. FIG. 7 is a block diagram of a two-level SS7 network including a summary of possible link deployment.

SS7 also includes a network protocol. As a protocol, SS7 defines a hierarchy or structure of the information contained in a message or data packet that is transmitted between SPs of an SS7 network over signaling links. This internal data structure is often referred to as an SS7 protocol stack which includes the following four SS7 levels:

| | |
|---|---|
| Level 1: | The Physical Level |
| Level 2: | The Datalink (or Link) Level |
| Level 3: | The Network Level |
| Level 4: | User Parts and Application Parts Level |

The physical level, also referred to as message transfer part (MTP) level 1, is the lowest or most fundamental level and is the first level that is used to interpret and process an incoming message. This level determines and/or provides the electrical characteristics to transmit the digital data over the interface being used. Following interpretation/processing at the physical level, the incoming message is passed up the stack to the datalink level.

The datalink level, also referred to as MTP level 2, resides adjacent and above the physical level and is responsible for providing error detection/correction and properly sequenced delivery of SS7 message packets. Following interpretation/processing at the datalink level, the incoming message is passed up the stack to the network level.

The network level, also referred to as MTP level 3, resides adjacent and above the datalink level and provides the information necessary for message packet routing, message packet discrimination, and message packet distribution. Functionally, message discrimination determines whether the message packet is addressed to the receiving SP or to another SP. If the message contains the local address of the receiving SP, then the message is passed on to message distribution. Message distribution routes the message to the proper application part or user part within the receiving SP. If the message is not addressed to the receiving SP, then it is passed on to the message router, which determines the physical address of the SP to which the message is to be sent.

Following interpretation/processing at the network level, the incoming message is passed up the stack to the user parts and application parts level.

The user parts and application parts level resides adjacent and above the network level. User part protocols perform call setup and tear down. Exemplary user part protocols that can be included in SS7 level 4 are ISDN user part (ISUP), telephone user part (TUP), and broadband ISDN user part (BISUP).

Application part protocols provide access to network databases for services, such as 800 number service, credit card verification, and number portability. The transaction capabilities application part (TCAP) protocol is an example of an SS7 level 4 protocol that can be used to provide access to these and other services.

The above description has assumed that an incoming message is being processed. An outgoing message is passed through the protocol stack in the opposite direction, entering at the user part level and exiting from the physical level. FIG. 8 illustrates SS7 protocol architecture relative to SS7 levels and relative to standard Open System Integration (OSI) layers.

The above-mentioned SS7 protocol levels are implemented by hardware and software residing in SS7 signaling points, such as signal transfer points (STPs). A high performance STP is marketed by the assignee of the present application as the Eagle® STP. A block diagram of a conventional Eagle® STP is shown in FIG. 9. A detailed description of the Eagle® STP can be found in the *Eagle® Feature Guide* PN/9110-1225-01, Rev. B, January 1998, published by Tekelec, the disclosure of which is hereby incorporated herein by reference. As described in this publication, Eagle® STP generally designated 900 includes the following subsystems: maintenance and administration subsystem (MAS) 910, communication subsystem 920 and application subsystem 930. MAS 910 provides maintenance communications, initial program load, peripheral services, alarm processing and system disks. Communication subsystem 920 includes an interprocessor message transport (IMT) bus that is the main communication bus among all subsystems in Eagle® STP 900. This high speed communications system functions as two 125 Mbps counter-rotating serial buses.

Application subsystem 930 includes application cards that are capable of communicating with the other cards through the IMT buses. The illustrated application subsystem 930 includes three types of application cards: link interface module (LIM) 940 that provides SS7 links and X.25 links, application communication module (ACM) 950 that provides a TCP/IP interface for sending copies of SS7 message signal units (MSUs) over ethernet, and application service module (ASM) 960 that provides global title translation, gateway screening and other services. A translation service module (TSM) can also be provided for local number portability.

LIM 940 provides level 1 and some level 2 functions on SS7 signaling links. ACM 950 provides access to a remote host for an STP LAN feature. The STP LAN feature provides unidirectional access to copies of SS7 MSUs from the STP to a remote host. Unidirectional connection from the STP to a host is provided through an ethernet LAN using TCP/IP protocol. Finally, ASM 960 provides additional memory that is used to store translation tables and screening data. A detailed description of the Eagle® STP is provided in the above-cited Feature Guide and need not be further described.

A brief conceptual overview of the Eagle® STP is provided in the brochure entitled *Eagle® STP Platform*, Publication 908-0126-01, Rev. A, Tekelec, 1997. As described therein, the Eagle® STP is a high capacity, fully fault tolerant packet switch and self-contained local area network for exchanging data messages between a half-dozen to several hundred or more message processing modules. In the Eagle® STP system architecture, three functionally specific application subsystems access each other via a communications subsystem which includes dual counter-rotating, 125 Mbps IMT buses. The application subsystems include LIMs that provide SS7 and X.25 access to telecommunication signaling networks, ACMs that provide TCP/IP access to local area networks and a MAS that provides maintenance communication, peripheral services alarm processing and system disks. As stated in this brochure, "ACMs communicate directly with external, collocated service application systems via a TCP/IP, 10 Mbit/sec LAN interface mounted on the Ethernet Interface Appliqué (EIA). Examples of external application systems include: an SCP not equipped with SS7 signaling links, a routing or charging database system, cellular/PCS home or visitor location registers (HLR, VLR), a message accounting system, a voice/record/image processing system, and other intelligent network (IN) service nodes and peripherals that require direct interface via SS7 signaling links." Thus, the Eagle® STP platform publication does not describe communication between an STP and an SS7 node. The ACM card described therein is used primarily for diagnostic purposes.

A detailed description of the operation of the Eagle® STP-LAN interface feature is provided in the brochure entitled *Eagle® STP STP LAN Interface Feature*, Publication 908-0134-01, Rev. B, Tekelec 1997. As described therein, "The STP-LAN Interface Feature enables the collection of copies of SS7 messages that transit the Eagle® STP. This feature, along with user-provided data processing equipment, allows the Eagle® STP to perform functions beyond normal Signal Transfer Point (STP) functionality, such as auditing and accounting functions, message trap and trace and protocol conformance analysis. The Eagle® STP-LAN Interface Feature enables the user to connect external data collection or processing systems directly to the Eagle® STP via TCP/IP, 10 Mbits/sec Ethernet LAN. It enables a user to select either ISUP messages, SCCP/TCAP messages, or both, for transfer to the external monitoring system. It also adds a time-stamp to identify the selected messages and their sequence for subsequent processing." As is also shown in this brochure, the Ethernet LAN link is a unidirectional link from the ACM to an external processor (host) for diagnostic purposes. Moreover, the Eagle® STP LAN feature is not suitable for communicating SS7 messages between SS7 signaling points, not to mention communicating messages to SS7 signaling points for call setup or other call-related signaling functions.

While communicating SS7 messages over SS7 links can be desirable in some instances, it can also be desirable to communicate SS7 messages over other types of networks. SS7 links provide a high-bandwidth, reliable communication medium for SS7 messages. However, a dedicated SS7 link is expensive and often provides too much bandwidth for a given application. In addition, the proliferation of networks other than SS7 networks makes these networks possible candidates for SS7 message traffic. One type of network conventionally used to transport SS7 messages is an X.25 network. For example, it is known to provide a database transport access feature that intercepts SS7 message signaling units originating from an X.25 network. This feature is described in a brochure entitled *Eagle® STP Database Transport Access Feature*, Publication 908-0136-01, Rev. B, Tekelec, 1997.

It is also known to use protocol converters for some protocols in connection with STPs. For example, the Eagle® STP X.25 protocol conversion feature provides interfacing and connectivity between nodes on an SS7 network and nodes on an X.25 network. This feature is described in a brochure entitled *Eagle® STPX.25 to SS7-IS.41 Protocol Conversion Feature*, Publication 908-0135-01, Rev. B, Tekelec, 1997. Similarly, it is known to provide an ANSI-ITU gateway to enable an Eagle® STP to interconnect to other types of signaling networks. This feature is described in a brochure entitled *Eagle® STP ANSI-ITU Gateway Feature*, Publication 908-0133-01, Rev. B, Tekelec, 1997.

Protocol converters are also known for translating protocols between SS7 and non-SS7 networks. For example, the Tekelec SS7-Frame Relay Access Device (FRAD) translates SS7 protocol information between an SS7 network and a frame relay network. This feature is described in a brochure entitled *SS7-Frame Relay Access Device SS7 Protocol Information Translator*, Publication 908-0167-01, Rev. A, Tekelec, 1997.

Protocol conversion for SS7 networks is also described in U.S. Pat. No. 5,793,771 to Darland et al., entitled "*Communication Gateway*" (hereinafter, "the '771 patent"). The '771 patent describes a system and method for protocol translation between a foreign postal telephone and telegraph network and a domestic communication service provider, for verifying international credit card numbers. The system includes a communications gateway that consists of a computer located between the foreign network and the domestic network exclusively for performing protocol conversion. The communications gateway is not a signal transfer point. The communications gateway is only a protocol converter, and the communications gateway includes an SS7 module for sending and receiving a plurality of incoming and outgoing SS7 queries and responses. The communications gateway also includes an inbound subsystem module, coupled to the SS7 module, for translating the incoming SS7 queries from an SS7 protocol to a non-SS7 protocol.

The '771 patent discloses that the inbound subsystem module converts incoming SS7 messages into network information distributed service (NIDS) format and TCP format. However, the only type of SS7 messages that are discussed are TCAP messages, where MTP and SCCP layers are removed from the messages and a TCP header is added to the messages. The translated incoming queries are forwarded to an end user using the non-SS7 protocol. The inbound subsystem module also translates any responses corresponding to the incoming SS7 queries from the non-SS7 protocol to the SS7 protocol.

The communications gateway of the '771 patent further includes an outbound subsystem module, coupled to the SS7 module, for translating outgoing SS7 queries from the non-SS7 protocol to the SS7 protocol. Again, these queries are disclosed as being TCAP queries for international credit card verification. The translated outgoing queries are sent via the SS7 module across an SS7 network. The outbound subsystem module also translates SS7 responses corresponding to the outgoing SS7 queries from the SS7 protocol to the non-SS7 protocol. The translated responses corresponding to the outgoing SS7 queries are forwarded to an end user while in the non-SS7 protocol.

U.S. Pat. No. 5,706,286 to Reiman et al., entitled "*SS7 Gateway*" discloses a protocol converter separate from an STP that converts TCAP queries to NIDS format and vice-versa for credit card validation.

U.S. Pat. No. 5,640,446 to Everett et al., entitled "*System and Method of Validating Special Service Calls Having Different Signaling Protocols*" discloses a protocol converter external to an STP that converts TCAP queries to NIDS format for calling card transactions.

One problem with conventional protocol converters is that these devices require specialized processing hardware and software that reside in a separate location from the STP. These protocol converters also lack the processing speed and functionality of a signal transfer point, such as the above-mentioned Eagle® STP.

Yet another problem with conventional protocol converters is that the protocol converters are incapable of converting SS7 messages to other protocols without terminating the layer being transported. As a result, protocol converters can be required to implement the entire protocol stack.

Yet another problem with the above-mentioned protocol converters is that they only address translation between SS7 TCAP messages and TCP packets. In encapsulating TCAP messages, the MTP layer 3 information is stripped from the message. There are numerous other SS7 message payload types (ISUP, TUP, BISUP, etc.) that cannot be TCP/IP-encapsulated and routed through an IP network without including at least some of the routing label information contained in MTP level 3. The functionality of such SS7 messages is impaired, if not destroyed in many cases without this MTP lower level or routing label information. In practice, such a protocol conversion task presents a more difficult and challenging problem than the relatively simple case of TCP/IP-encapsulated TCAP/SCCP information.

Accordingly, there exists a long-felt need for methods and systems for transmitting SS7 user part messages including lower-level MTP protocol information, over an IP network using signal transfer points.

DISCLOSURE OF THE INVENTION

The present invention includes methods and systems for communicating user part messages between SS7 signaling points. As used herein, the phrase "user part messages" includes any SS7 user part messages, such as ISUP messages, BISUP messages, and TUP messages. In addition, the phrase "user part messages" is intended to encompass any future protocol messages used to transport call signaling information between SS7 signaling points and/or IP nodes.

According to one aspect, the present invention includes methods and systems for transmitting SS7 user part messages between SS7 signaling points. A first SS7 user part message is received at a signal transfer point from a first SS7 signaling point. For example, the first SS7 user part message can be an ISUP message received from an SSP. The signal transfer point encapsulates the first SS7 user part message in a first IP packet. The signal transfer point then transmits the first IP packet to a second SS7 signaling point over an IP network.

According to another aspect, the present invention includes methods and systems for encapsulating SS7 user part messages for transmission over an internet protocol network. In order to encapsulate the SS7 user part message, a signal transfer point extracts at least some of the SS7 layer 3 information from an SS7 message signaling unit (MSU). The extracted portion includes SS7 routing information for the MSU. The extracted portion of the SS7 MSU is encapsulated in a transport adapter layer interface packet including an application-level sequence number. An IP header is added to the transport adapter layer interface packet to produce an IP packet.

According to another aspect, the present invention includes a method for decapsulating an IP-encapsulated SS7 user part message utilizing a signal transfer point and receives an IP-encapsulated SS7 user part message and removes the IP header from the message. The signal transfer point then reads MTP layer 3 information from a data portion of the message to determine an SS7 signaling link on which to route the message. The signal transfer point then adds SS7 layers 1 and 2 information to the message thereby forming a complete SS7 MSU.

According to another aspect, the present invention includes a method for reliably recovering SS7 user part message packets when a TCP socket fails. The method includes establishing first and second TCP connections over first and second sockets between first and second SS7 nodes. Data packets are transmitted from the first SS7 node to the second SS7 node over one of the TCP connections. The data packets each include an application-level sequence number indicator for sequencing data packets received by the first and second SS7 nodes. In response to determining that one of the TCP sockets has failed, a recovery packet is transmitted from each node to the other node including the application-level sequence number indicating the last data packet received by each node. Data communications can then occur over the socket that did not fail.

According to another aspect, the present invention includes a data structure for communicating SS7 user part messages between SS7 nodes. The data structure includes a data field for encapsulating MTP layer 3 information. An application-level user part field stores an application-level sequence number. An IP header field stores IP information including an internet protocol address.

According to another aspect, the present invention includes computer program products comprising computer-executable media for performing steps for processing IP-encapsulated SS7 MSUs and for encapsulating SS7 MSUs in IP packets. As used herein, the phrase, "computer-readable medium" includes: magnetic, optical, and electrical storage media, such as disk storage devices, memory chips, and propagated electrical signals.

It is therefore an object of the present invention to provide novel, improved methods and systems for communicating user part messages between SS7 nodes using STPs.

It is another object of the present invention to provide improved methods and systems for communicating SS7 messages, including level 3 routing information, between an STP and other SPs of an SS7 network.

It is yet another object of the present invention to provide improved methods and systems for communicating SS7 messages between an STP and other SPs of an SS7 network, which can reduce the capital and maintenance expenses of connecting an STP to other SPs of an SS7 network.

It is yet another object of the invention to provide methods and systems for communicating user part messages between SS7 nodes with increased reliability.

These and other objects are achieved in whole or in part by the present invention. Some of the objects of the invention having been stated hereinabove, other objects will become evident as the description proceeds, when taken in connection with the accompanying drawings as best described hereinbelow.

BRIEF DESCRIPTION OF THE DRAWINGS

The present invention will now be explained with reference to the accompanying drawings of which.

DETAILED DESCRIPTION OF PREFERRED EMBODIMENTS

The present invention now will be described more fully hereinafter with reference to the accompanying drawings, in which preferred embodiments of the invention are shown. This invention can, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
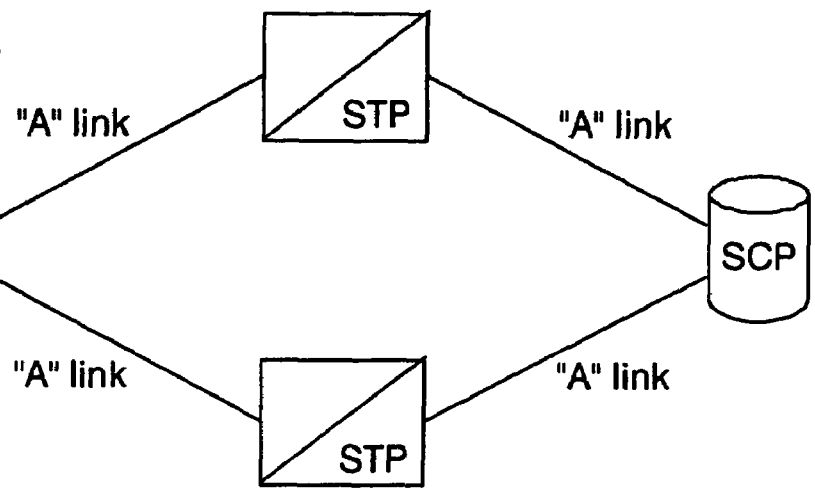
FIGS. 1–7 are block diagrams illustrating signaling datalinks and SPs of conventional SS7 networks.
Figure 2:
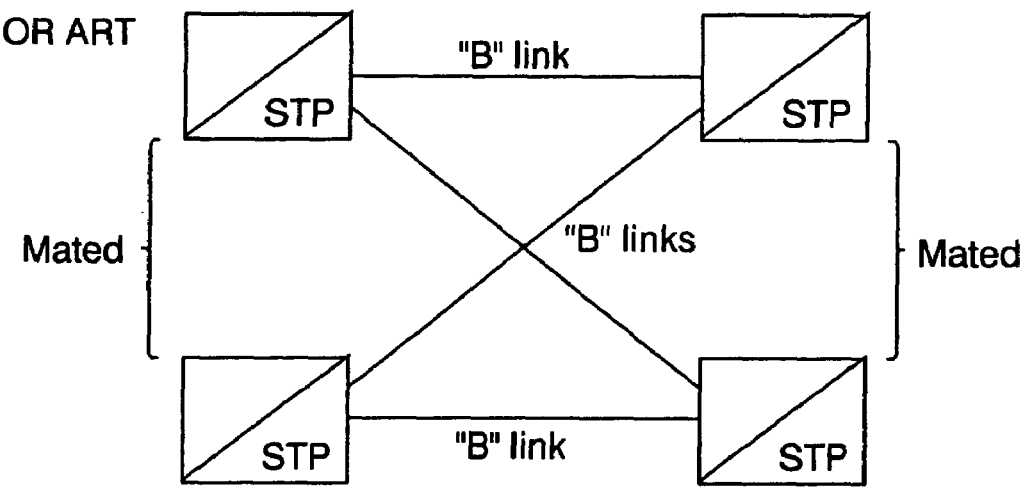
Figure 3:
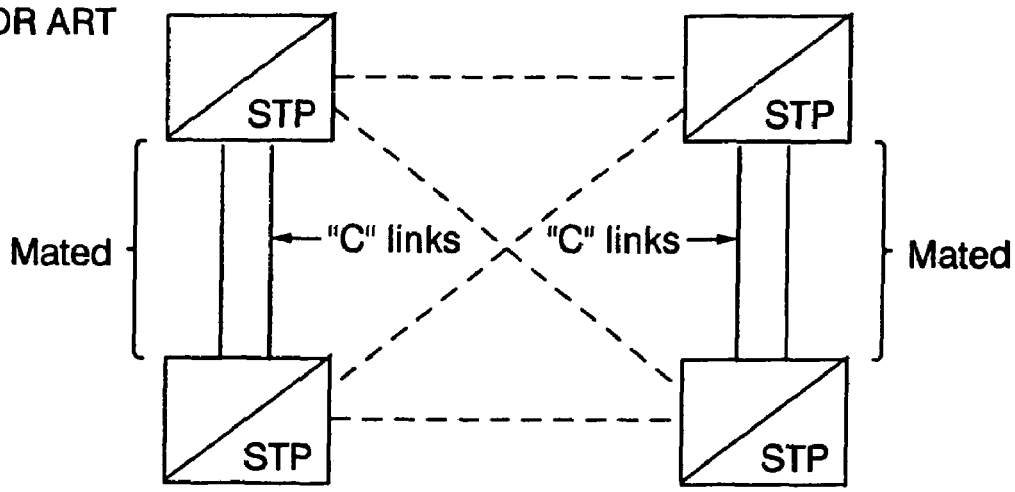
Figure 4:
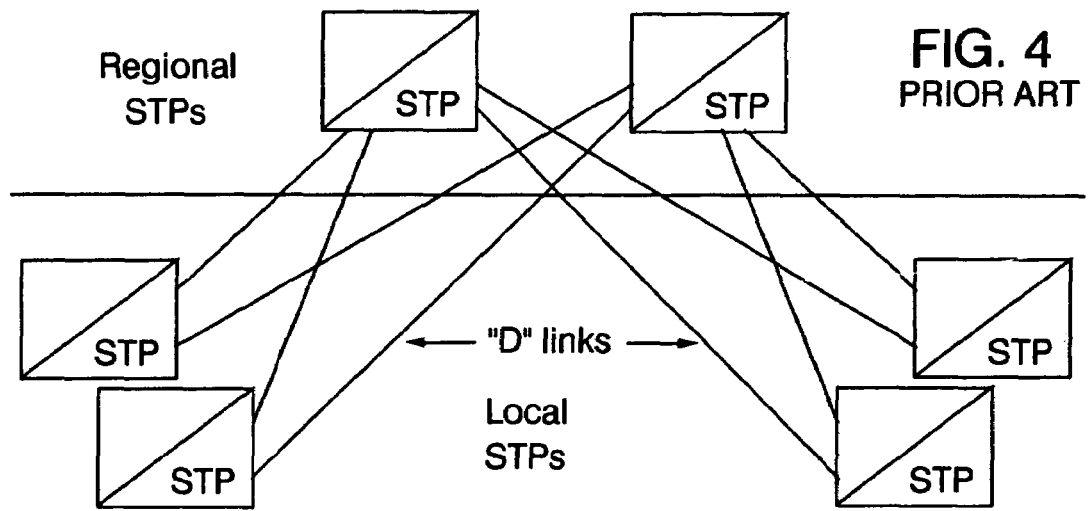
Figure 5:
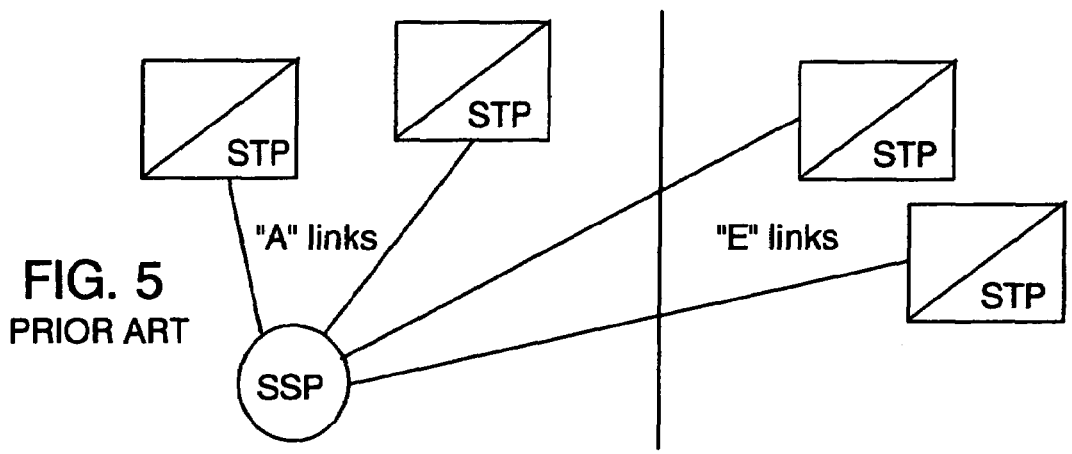
Figure 6:
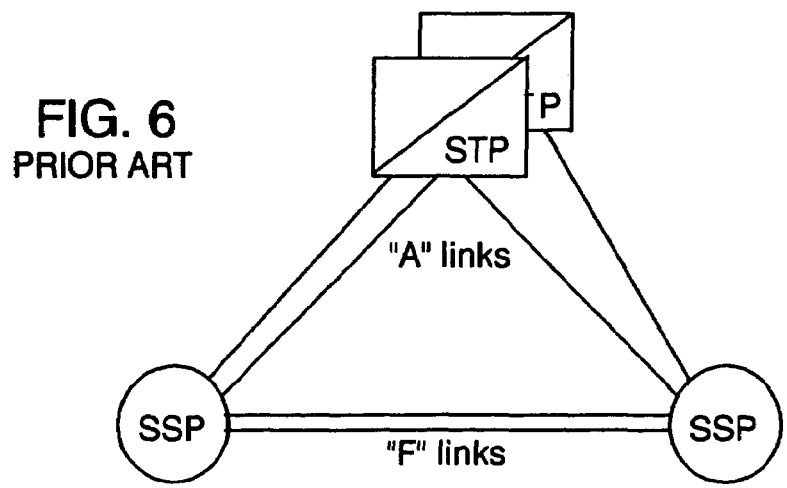
Figure 7:
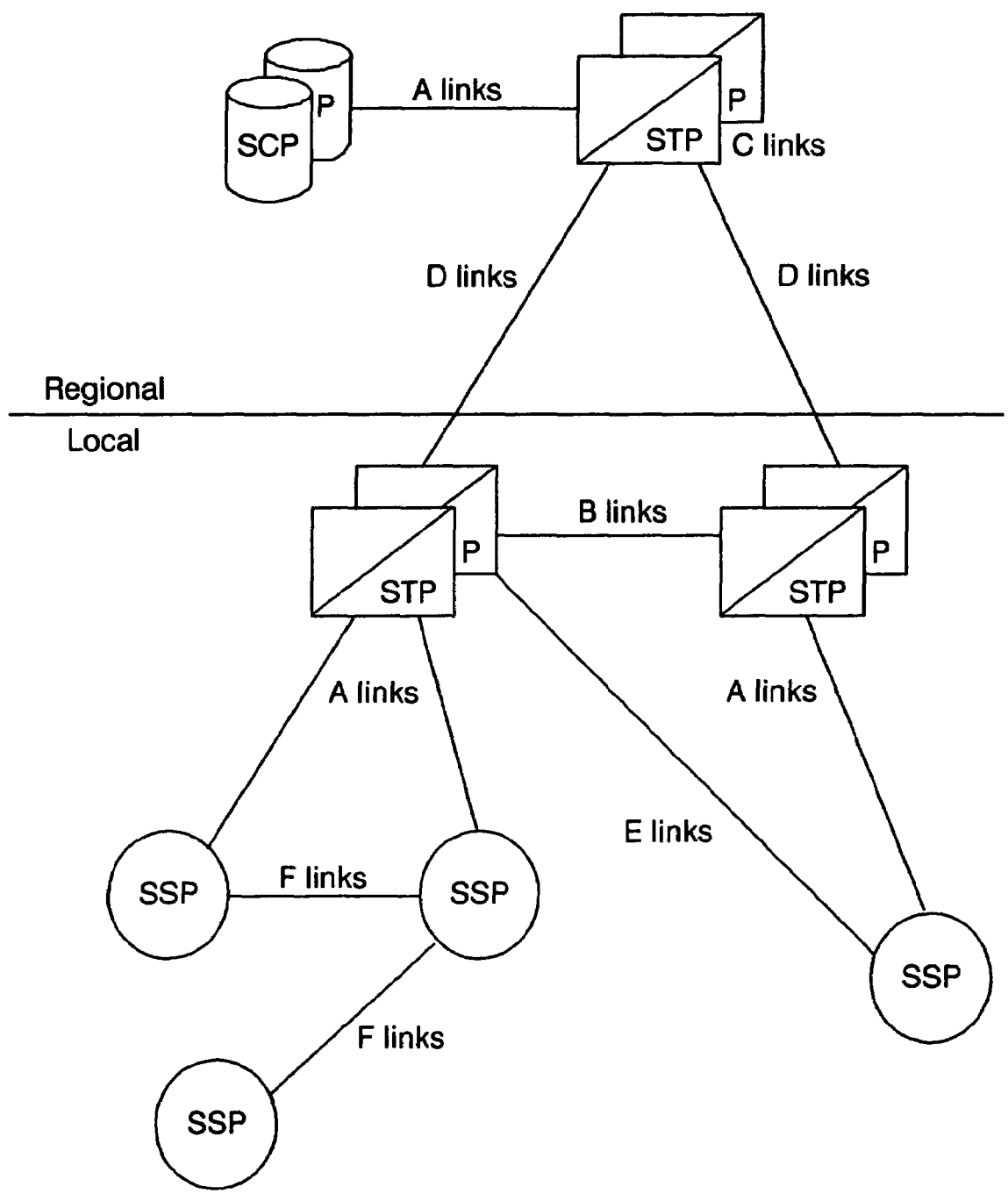
Figure 8:
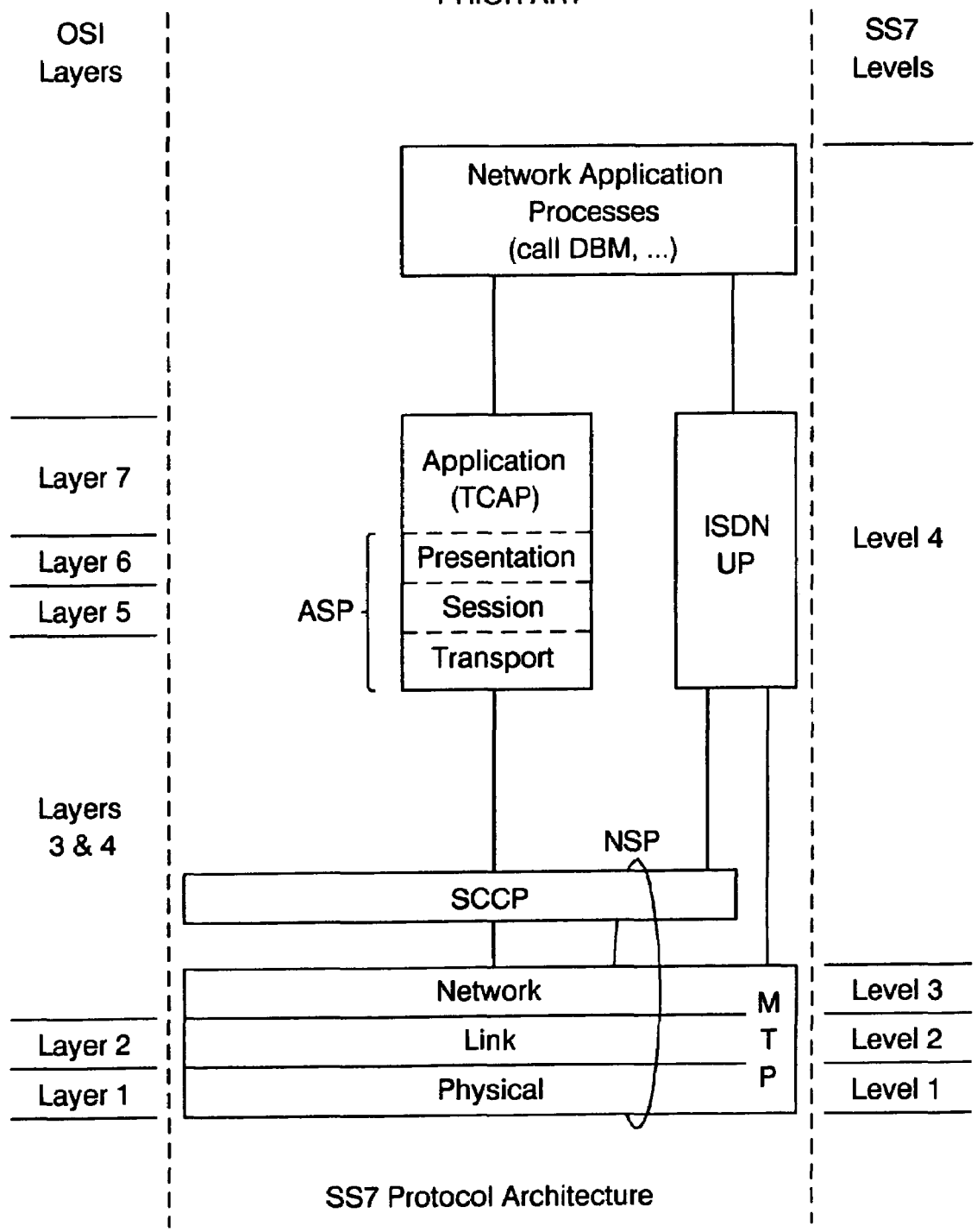
FIG. 8 is a block diagram illustrating SS7 protocol architecture relative to SS7 levels and relative to standard open system integration (OSI) layers.
Figure 9:
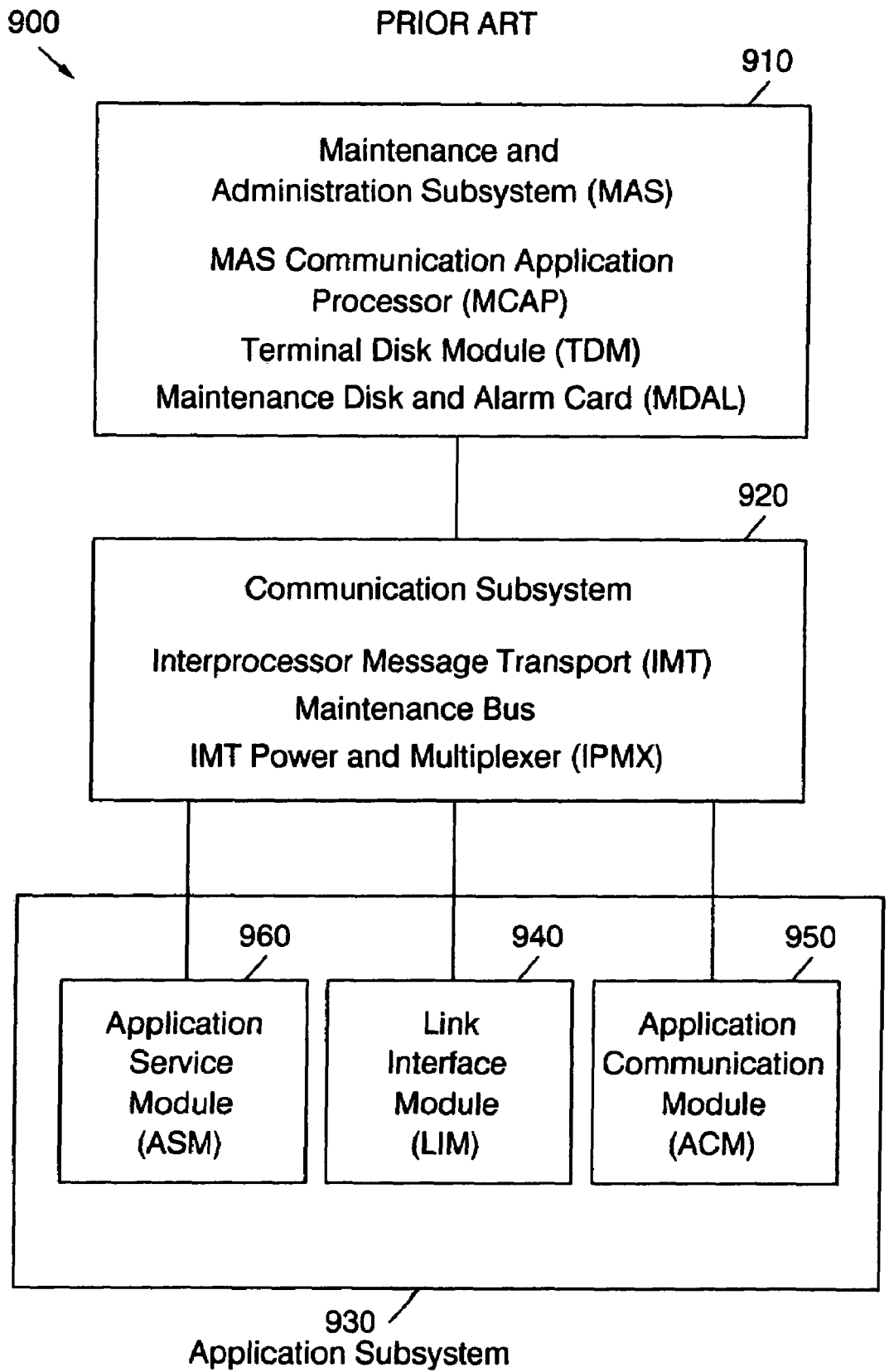
FIG. 9 is a block diagram of a conventional Eagle® STP.
Figure 10:
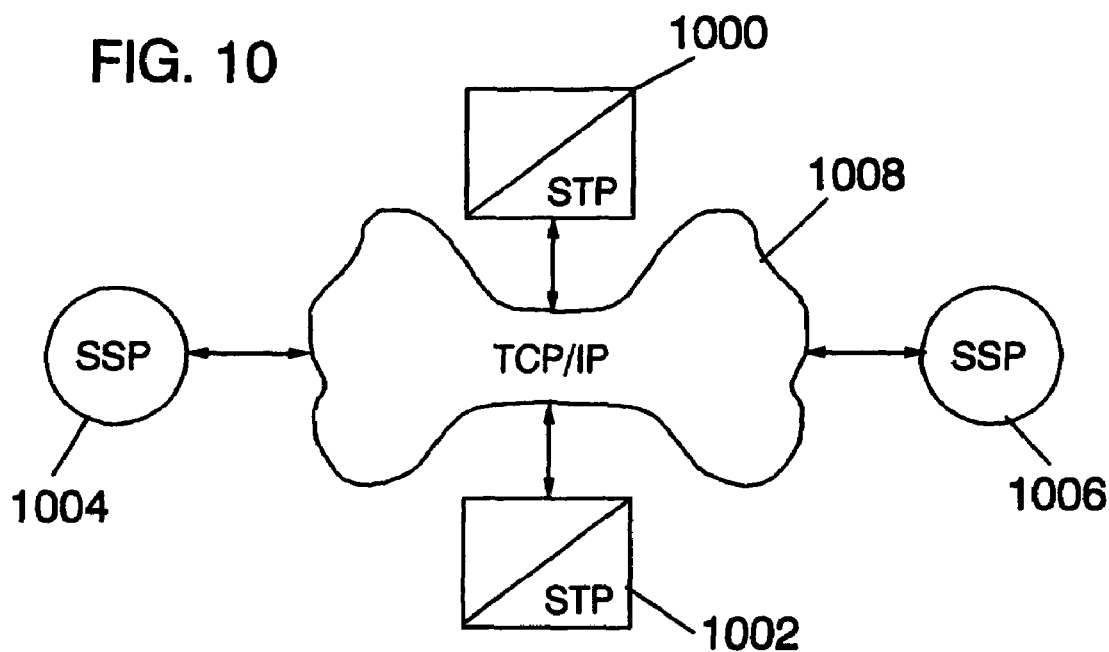
FIGS. 10–14 are block diagrams illustrating exemplary network configurations for bidirectional communication of SS7 user part messages between an STP and at least one of the other SPs in an SS7 network using TCP/IP according to embodiments of the present invention.

Exemplary Network Configurations for Bi-Directional Communication of User Part Messages FIGS. 10–14 are block diagrams illustrating exemplary network configurations for bidirectional communication of SS7 user part messages between an STP and at least one of the other SPs in an SS7 network using TCP/IP according to embodiments of the present invention. More specifically, FIG. 10 illustrates an exemplary network configuration for bidirectional communication of SS7 user part messages between an STP and at least one SSP using TCP/IP, to thereby replace SS7 A links with TCP/IP links. For example, STPs 1000 and 1002 can transmit SS7 user part messages to and receive SS7 user part messages from SSPs 1004 and 1006 over TCP/IP network 1008.

Figure 11:
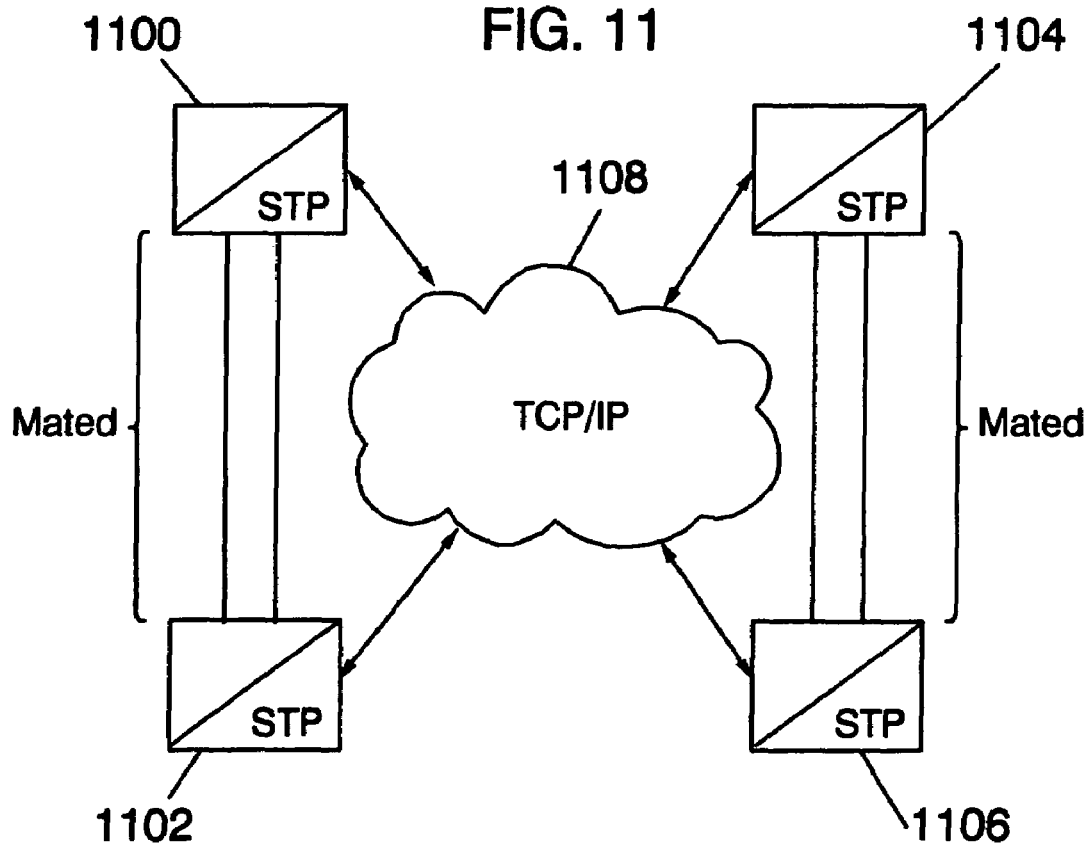

FIG. 11 illustrates an exemplary-network configuration for bidirectional communication of SS7 user part messages between STPs of the same hierarchical level, replacing SS7 B links with TCP/IP links. For example, mated STPs 1100 and 1102 can send SS7 user part messages to and receive SS7 user part messages from mated STPs 1104 and 1106 through TCP/IP network 1108.

Figure 12:
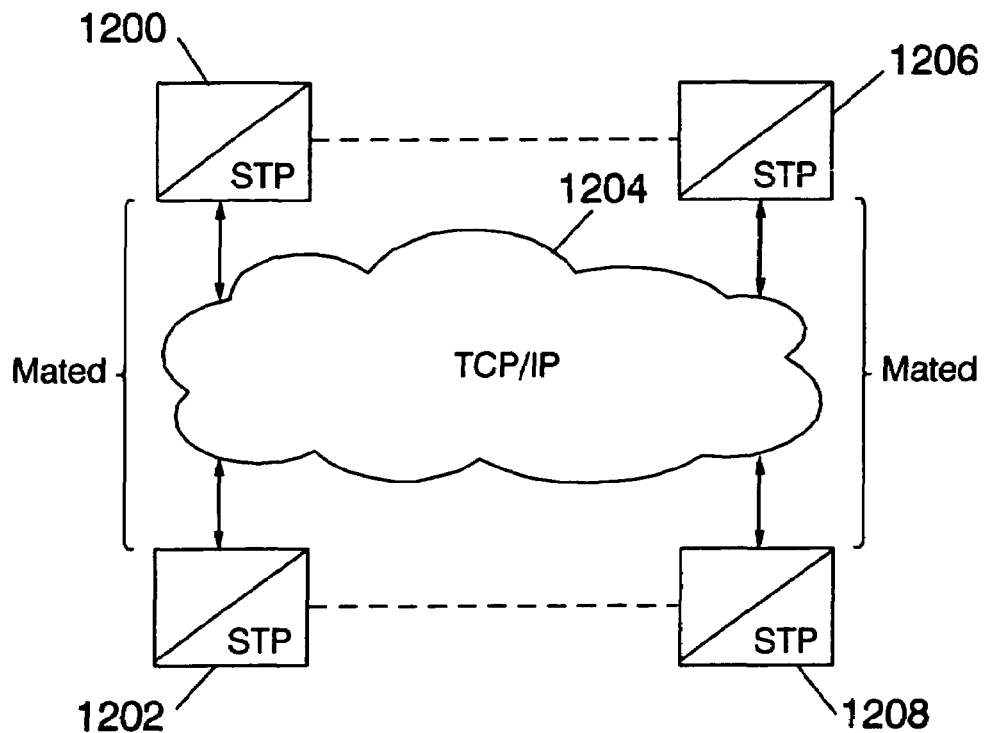

FIG. 12 illustrates an exemplary network configuration for bidirectional communication of user part messages between mated STPs using TCP/IP, replacing SS7 C links with TCP/IP links. For example, STP 1200 can send SS7 user part messages to and receive SS7 user part messages from STP 1202 through TCP/IP network 1204. Similarly, STP 1206 can send SS7 user part messages to STP 1208 and receive SS7 user part messages from STP 1208 through TCP/IP network 1204.

Figure 13:
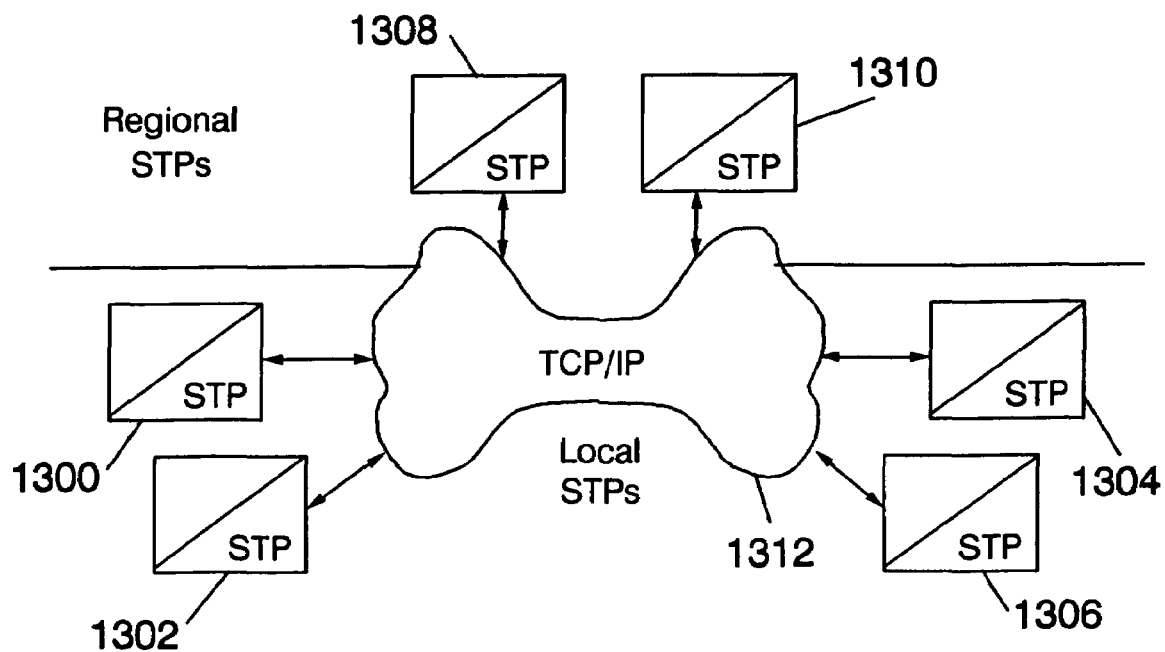

FIG. 13 illustrates an exemplary network configuration for bidirectional communication of user part messages between STPs of different hierarchical levels using TCP/IP links, replacing D links with TCP/IP links. For example, local STPs 1300–1306 can send SS7 user part messages to regional STPs 1308 and 1310 and receive SS7 user part messages from regional STPs 1308 and 1310 through TCP/IP network 1312.

Figure 14:
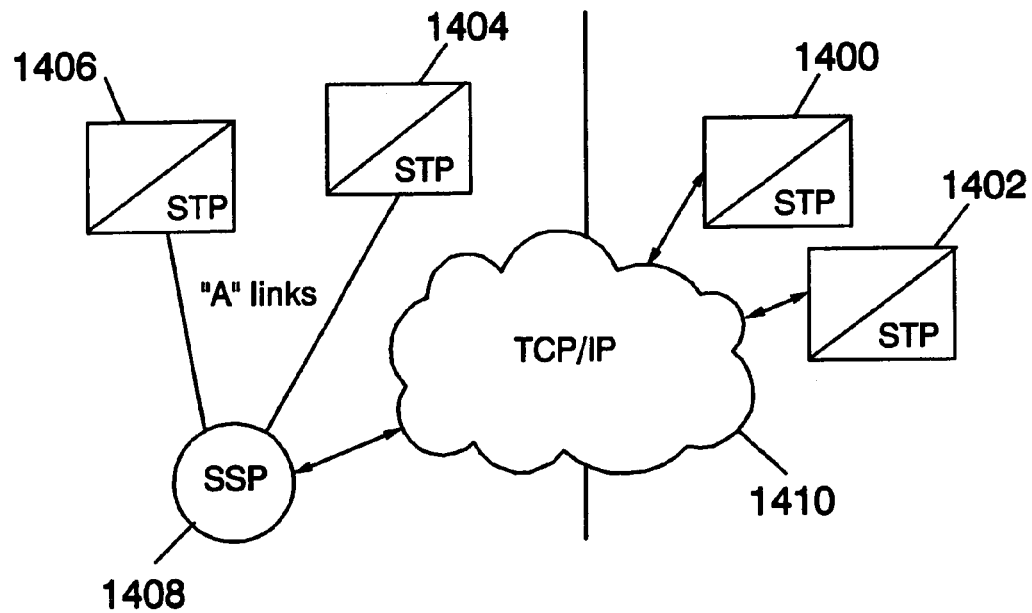

FIG. 14 illustrates an exemplary network configuration for bidirectional communication of SS7 user part messages between STPs and SSPs that are not within the same local STP area using TCP/IP, replacing E links with TCP/IP links. For example, STPs 1400 and 1402 can be located in a different local area from STPs 1404 and 1406 and SSP 1408. Communication of user part messages between STPs 1400 and 1402 and SSP 1408 would thus conventionally occur over E links. However, according to the present invention, the E links are replaced by TCP/IP network 1410. As such, STPs 1400 and 1402 are capable of sending SS7 user part messages to and receiving SS7 user part messages from STPs 1404 and 1406 and SSP 1408 through TCP/IP network 1410. TCP/IP can also be used to replace combinations of A through E links by combining one or more of FIGS. 10–14.

STP Including SS7/IP User Part Communicator

Figure 15:
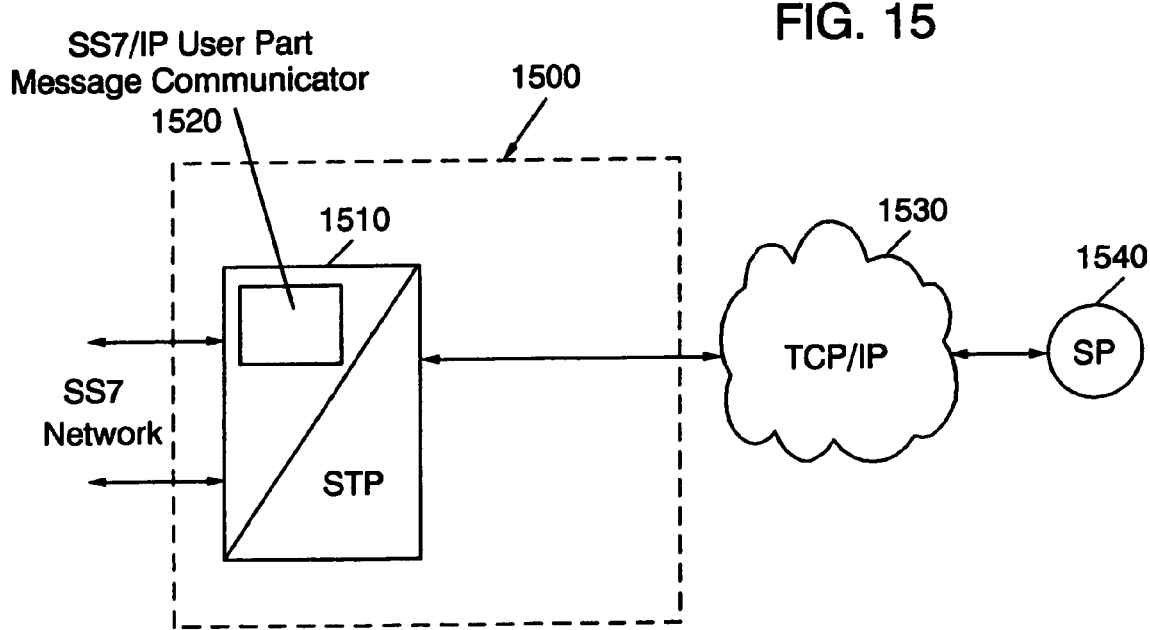
FIG. 15 is a block diagram of an SP according to an embodiment of the present invention.
Figure 16:
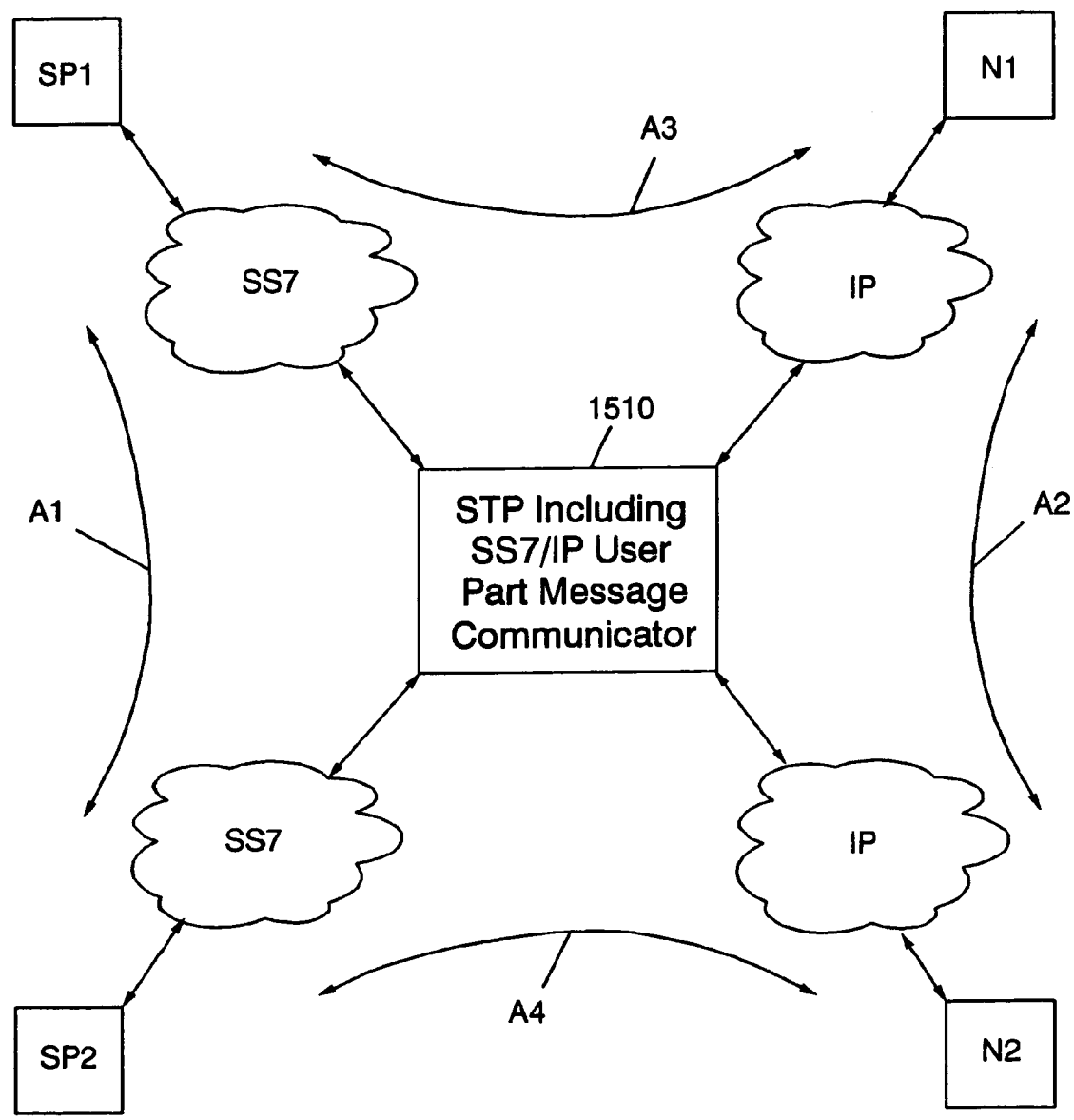
FIG. 16 is a block diagram illustrating-bidirectional transport of user part messages among SS7 and IP network elements using an STP according to an embodiment of the present invention.

FIG. 15 is a block diagram of an SP generally designated 1500 according to the present invention. SP 1500 can also be referred to as a "node" of an SS7 network. SP 1500 can comprise any suitable combination of hardware and software for performing the SS7 and IP switching functions. As shown in FIG. 15, SP 1500 includes STP 1510 that transfers messages between other SPs of the SS7 network using the SS7 protocol. SP 1500 also includes an SS7/IP user part message communicator 1520 that is preferably integrated within STP 1510 to bidirectionally communicate at least some of the transferred SS7 user part messages between the STP 1510 and at least one of the other SPs, such as SP 1540, of the SS7 network using an IP network and preferably using TCP/IP network 1530. In an alternative embodiment, SS7/IP user part message communicator 1520 can be located external to STP 1510.

STP 1510 including SS7/IP user part message communicator 1520 can be used to provide seamless transport among SS7 user part network elements, and among IP network elements. For example, as shown in FIGS. 1–6, STP 1510 can be used to bidirectionally communicate SS7 messages and other messages between a first signaling point SP1 and a second signaling point SP2 of two separate SS7 networks as shown by the bidirectional arrow A1. Moreover, STP 1510 can also be used to bidirectionally communicate SS7 user part messages or other messages between a first IP node N1 and a second IP node N2 via one or more IP networks, as shown by bidirectional arrow A2.

Finally, as shown by bidirectional arrows A3 and A4, STP 1510 can be used to communicate SS7 user part messages or other messages between signaling points SP1 and SP2 and IP nodes N1 and N2. Thus, an STP including an SS7/IP user part message communicator can become a router for communicating user part messages among SPs in an SS7 network, between SPs in an SS7 network and nodes in an IP network, and among nodes in an IP network. Seamless transport of user part messages between SS7 and IP network elements can thereby be provided using an STP with an SS7/IP user part message communicator.

Figure 17:
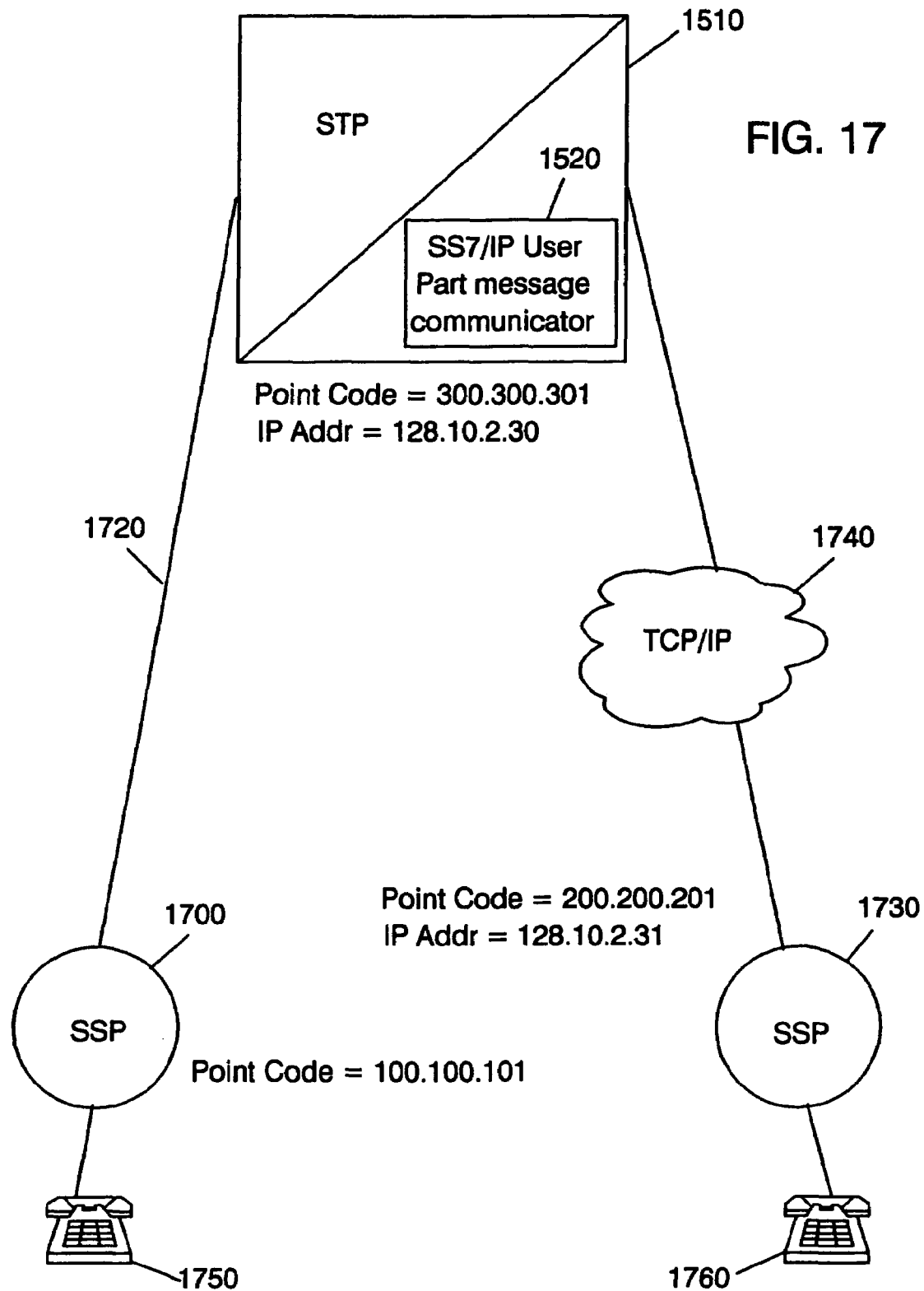
FIG. 17 is a block diagram illustrating an exemplary network configuration for user part message flow according to an embodiment of the present invention.

As stated above, user part messages, such as ISUP messages, are used to perform call setup and tear down functions. FIG. 17 illustrates an exemplary network configuration for communicating user part messages between end offices in performing call setup. In FIG. 17, SSP 1700 is connected to STP 1510 through SS7 link 1720. For example, SS7 link 1720 can comprise an A link. STP 1510 is connected to another SSP 1730 through a TCP/IP network 1740. TCP/IP network 1740 replaces an SS7 A link between STP 1710 and SSP 1730. STP 1510 includes an SS7/IP user part message communicator 1520 for bidirectionally communicating user part messages between SSP 1700 and SSP 1730. In the illustrated network, the SSP 1730 is preferably capable of communicating using TCP/IP. In an alternative network configuration, SSP 1730 might not be TCP/IP-enabled and an additional STP including an SS7/IP user part message communicator or a protocol converter can be connected between TCP/IP network 1740 and SSP 1730. Either configuration is within the scope of the present invention.

Each of the nodes in the network configuration illustrated in FIG. 17 has MTP level 3 routing information including a point code. In the illustrated network, SSP 1700 has a point code of 100.100.101. The SSP 1730 has a point code of 200.200.201. STP 1510 has a point code of 300.300.301. Because STP 1510 and the 1730 are connected over an IP network, STP 1510 and SSP 1730 also have IP addresses. In the illustrated embodiment, STP 1710 has an IP address of 128.10.2.30 and SSP 1730 has an IP address of 128.10.2.31.

Figure 18:
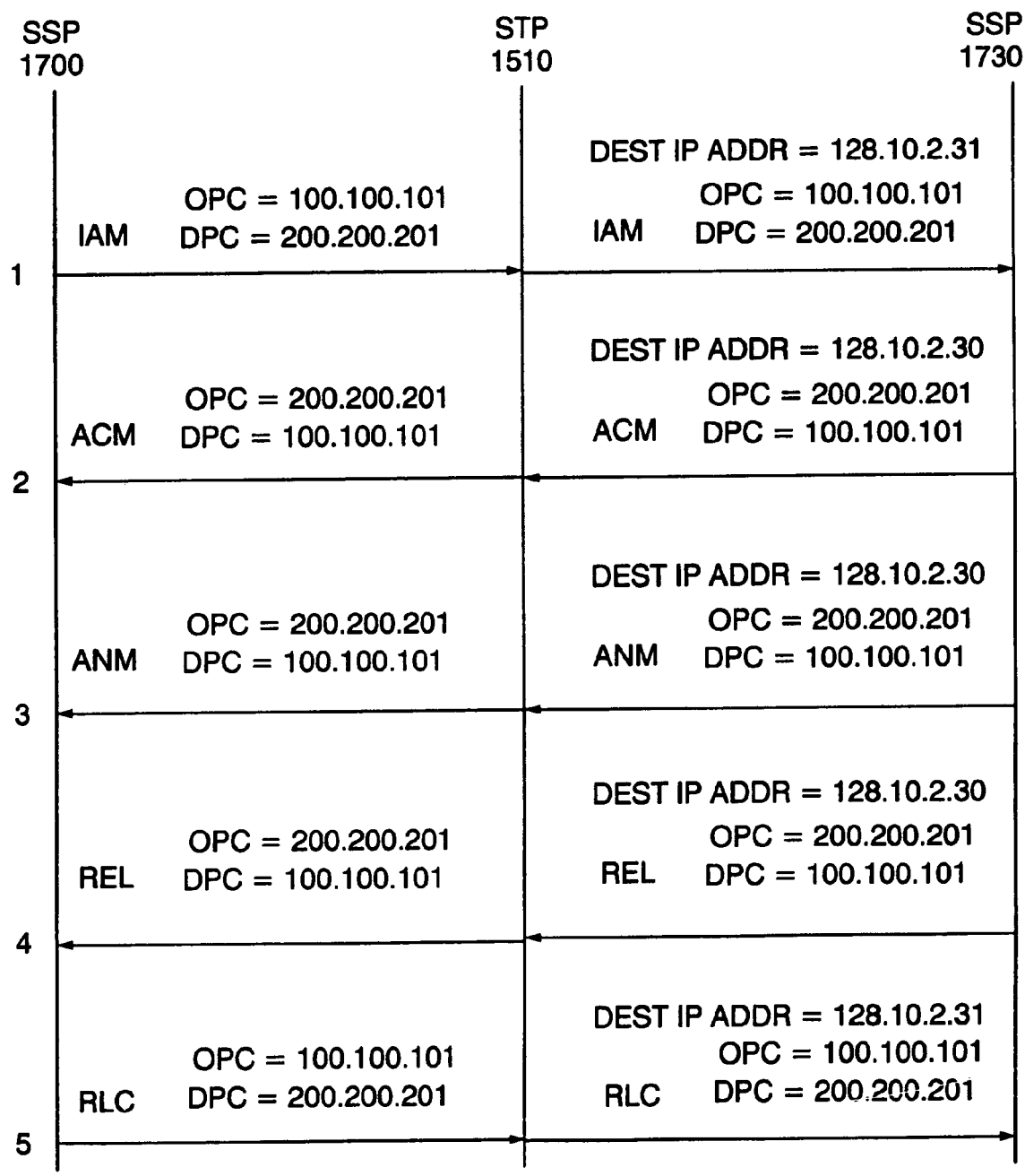
FIG. 18 is a call flow diagram illustrating exemplary user part message flow in the network configuration illustrated in FIG. 17.

FIG. 18 illustrates an exemplary call flow diagram illustrating the flow of ISUP messages between SSP 1700 and SSP 1730 in performing call setup. In line 1 of the call flow diagram, SSP 1700 transmits an initial address message (IAM) message addressed to SSP 1730 to STP 1510. The IAM message has an originating point code of 100.100.101 and a destination point code of 200.200.201. When STP 1510 receives the IAM message, STP 1510 does not change the SS7 originating point code or destination point code. Rather, STP 1510 encapsulates the IAM message in a TCP/IP packet with a destination IP address of 128.10.2.31, i.e., the IP address of SSP 1730. The TCP/IP packet also includes the source IP address of 128.10.2.30, i.e., the IP address of STP 1510.

In line 2 of the call flow diagram, SSP 1730 transmits an address complete message (ACM) to SSP 1510. The address complete message includes an originating point code of 200.200.201, i.e., the point code of SSP 1730, and a destination point code of 100.100.101, i.e., the point code of SSP 1700. The destination IP address, however, is that of STP 1510, i.e., 128.10.2.30. The STP 1510 receives the ACM message, removes the TCP/IP header, attaches any needed SS7 information, and forwards the ACM message to SSP 1700.

In line 3 of the call flow diagram, when the calling party answers the call, SSP 1730 transmits an answer message (ANM) to SSP 1700. The answer message can be transmitted in a manner similar to the ACM message and thus the transmission need not be further described.

Once the answer message has been received by SSP 1700, a call between end users 1750 and 1760 is in progress. The call continues until either party goes on-hook. In the illustrated call flow diagram, when end user 1760 connected to SSP 1730 goes on-hook, a release message (REL) is transmitted from SSP 1730 to SSP 1700. The release message is addressed and routed in a manner similar to the ACM message described above. The SSP 1700 responds to the release message by transmitting a release complete message (RLC) to SSP 1730. The release complete message is addressed and routed in a manner similar to the IAM message described above.

Because STP 1510 performs bidirectional communication of user part messages between end offices, the resources required for performing call setup operations are reduced. For example, it is no longer necessary to have dedicated SS7 links between end offices for performing call signaling operations. One or more of the links can be replaced by an IP network, such as a TCP/IP network or a UDP/IP network.

Bidirectional Communication Methods and Computer Programs

An STP for an SS7 network according to the present invention includes means for and provides the steps of, bidirectionally transferring SS7 user part messages among SPs of the SS7 network. The STP also includes means for and provides the steps of bidirectionally transferring user part messages between SPs of the SS7 network and IP nodes of an IP network. The STP also includes means for and provides the steps of, bidirectionally transferring messages among IP nodes of the IP network. Bidirectional transfer preferably takes place using TCP/IP.

Figure 19:
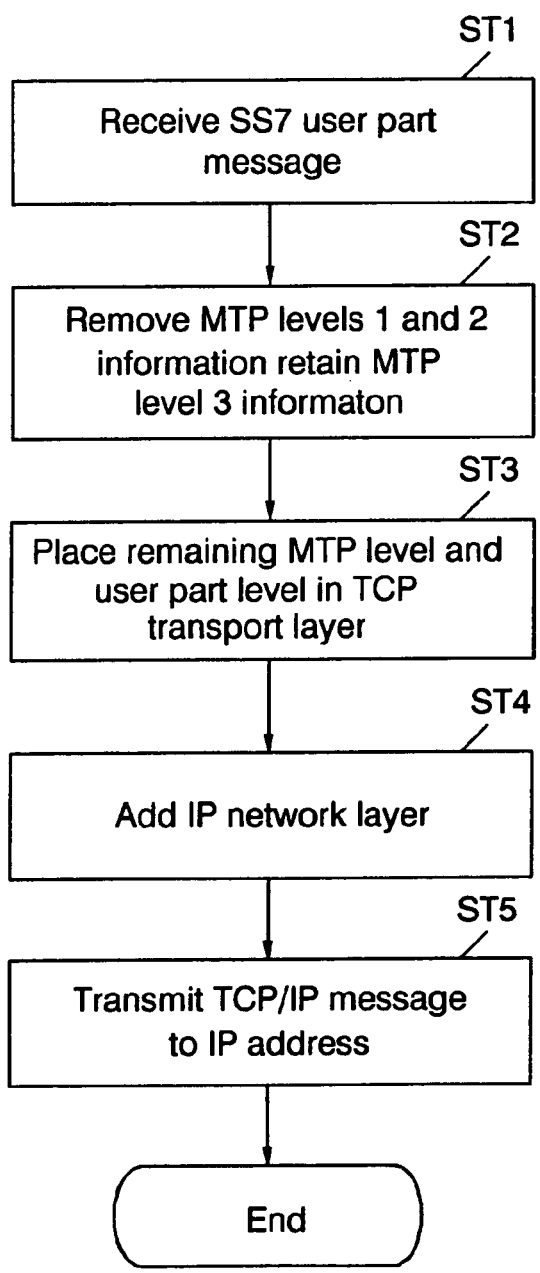
FIGS. 19 and 20 are flowcharts illustrating bidirectional communication of SS7 messages between an STP and at least one other SP according to embodiments of the present invention.
Figure 20:
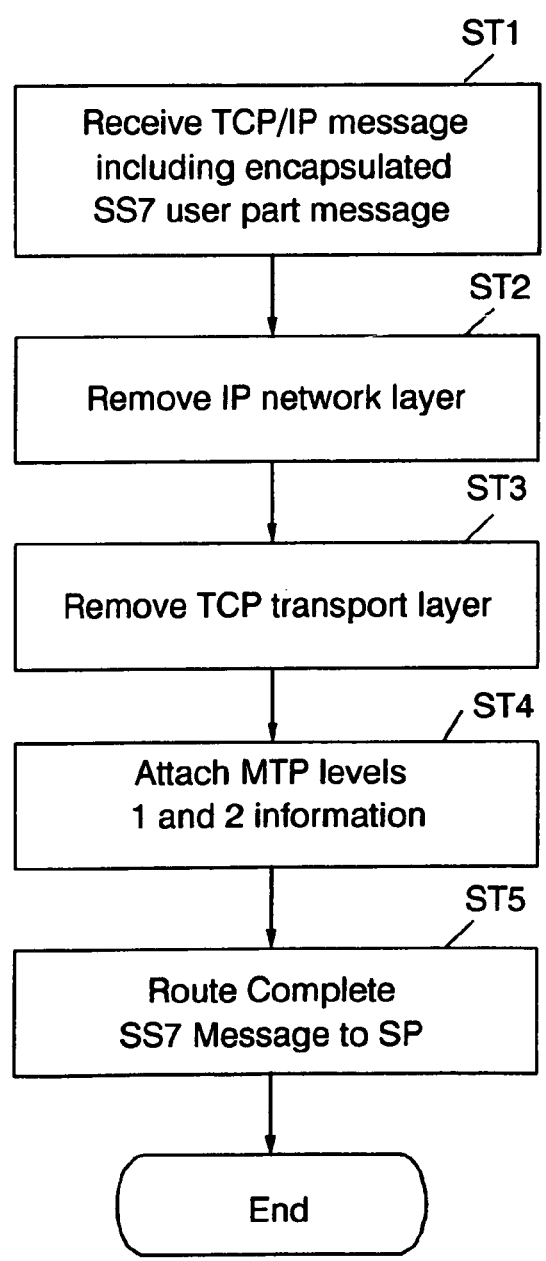

FIGS. 19 and 20 are flowcharts and FIGS. 21–24 are block diagrams illustrating exemplary hardware and software for bidirectional communication of SS7 user part messages between an STP and at least one of the other SPs of an SS7 network according to embodiments of the present invention. The present invention can be embodied as methods, systems (apparatus), and/or computer program products. Accordingly, the present invention can take the form of an entirely hardware embodiment, an entirely software embodiment or an embodiment combining software and hardware aspects.

It will also be understood that one or more of the blocks in FIGS. 19–24, and combinations of these blocks, can be implemented by computer program instructions. These computer program instructions can be provided to a processor or other programmable data processing apparatus to produce a machine, such that the instructions which execute on the processor or other programmable data processing apparatus create means for implementing the functions specified in the flowchart block or blocks. These computer program instructions can also be stored in a computer-readable medium that can direct a processor or other programmable data processing apparatus to function in a particular manner, such that the instructions stored in the computer-readable medium produce an article of manufacture including instruction means which implement the functions specified in the flowchart block or blocks.

Accordingly, blocks in FIGS. 19–24 support combinations of means for performing the specified functions, combinations of steps for performing the specified functions and program instruction means for performing the specified functions. It will also be understood that each block, and combinations of blocks, can be implemented by special purpose hardware-based computer systems which perform the specified functions or steps, or by combinations of special purpose hardware and computer instructions.

FIG. 19 illustrates exemplary steps that can be performed by an SS7/IP user part message communicator embodied in an STP in processing an SS7 user part message for transmission over an IP network according to an embodiment of the present invention. In step ST1 the SS7/IP user part message communicator receives an SS7 user part message from an SS7 node. The SS7 user part message includes an SS7 MTP level and an SS7 user part level, such as an ISUP level. A portion of the MTP level information can be stripped or removed from the SS7 message, as shown in step ST2. However, according to a preferred embodiment of the invention, MTP level 3 routing information is preferably retained in the message.

In step ST3, the remaining MTP level information and user part level in the SS7 message are placed in a TCP transport layer to create a TCP message. The TCP transport layer preferably includes the TCP port on which a connection has been established with the destination SS7 or IP node. It should be noted at this point that all of the information contained in the original SS7 MTP level can be placed in the TCP transport layer, if desired. Furthermore, the MTP level information that is ultimately included in the TCP transport layer can be modified or altered from its original form prior to TCP encapsulation. That is, the bit stream representing the MTP level information in the original SS7 MSU and the bit stream representing the MTP level information in the TCP-encapsulated message need not be identical. In addition, additional data, such as application-level sequence number data and operation code data can be added to the message before or after the message is TCP- or IP-encapsulated.

In step ST4, an IP network layer is added to the TCP message to create a TCP/IP message. The IP network layer includes the destination IP address of the node to which the original SS7 messages was addressed. The destination IP address can be determined using a lookup table or other routing mechanism based on the destination point code in the original SS7 message. In an alternative embodiment of the invention, steps ST3 and ST4 can be combined so that the TCP and IP information is added in a single step. Finally, in step ST5, the TCP/IP message is transmitted to the IP address over an IP network 1530 (FIG. 15) using TCP transport. The IP address can represent an SS7 node configured to communicate using TCP/IP or a TCP/IP node without SS7 capabilities. Thus, the user part message can be sent from an STP, another SS7 node, or an IP node using a TCP/IP network.

FIG. 20 illustrates processing that can be performed by SS7/IP user part message communicator 1520 of STP 1510 (FIG. 15) in processing an IP-encapsulated SS7 message according to an embodiment of the present invention. As shown in step ST1, a TCP/IP message including an encapsulated SS7 user part message is received from an IP network. The TCP/IP message includes SS7 MTP level information and user part payload data that are encapsulated in TCP transport and IP network layers. In step ST2, the IP network layer is removed from the IP message to create a TCP message that includes SS7 MTP level information and SS7 user part payload data in a TCP transport layer. In step ST3, the TCP transport layer is removed from the TCP message to create an SS7 message including SS7 MTP level 3 information and an SS7 user part payload level. In an alternative embodiment of the invention, steps ST2 and ST3 can be combined such that the TCP/IP information is removed in one step. Additional information, such as an application-level sequence number and an operations code can be also removed from the message and processed. In step ST4, MTP levels 1 and 2 information is attached to the message, as required, to form a functional SS7 message. If no MTP level information was removed from the TCP/IP message by SP 1540, then no additional MPT levels 1 and 2 information needs to be added. Finally, in step ST5, the SS7 message is routed. Thus, message can be sent from SP 1540 to STP 1510 using the TCP/IP network 1530, rather than an SS7 link.

Although the flow charts in FIGS. 19 and 20 respectively show the addition and removal of TCP transport layer information from an SS7 user part message, the present invention is not limited to such an embodiment. For example, in an alternative embodiment, an SS7 user part message can be encapsulated in a UDP/IP message for transmission over a UDP/IP network. Similarly, UDP/IP-encapsulated SS7 user part messages can be received over a UDP/IP network and the UDP/IP portion of the messages can be removed to produce the SS7 user part messages.

Hardware for Performing Bi-Directional SS7/IP User Part Message Communications

Figure 21:
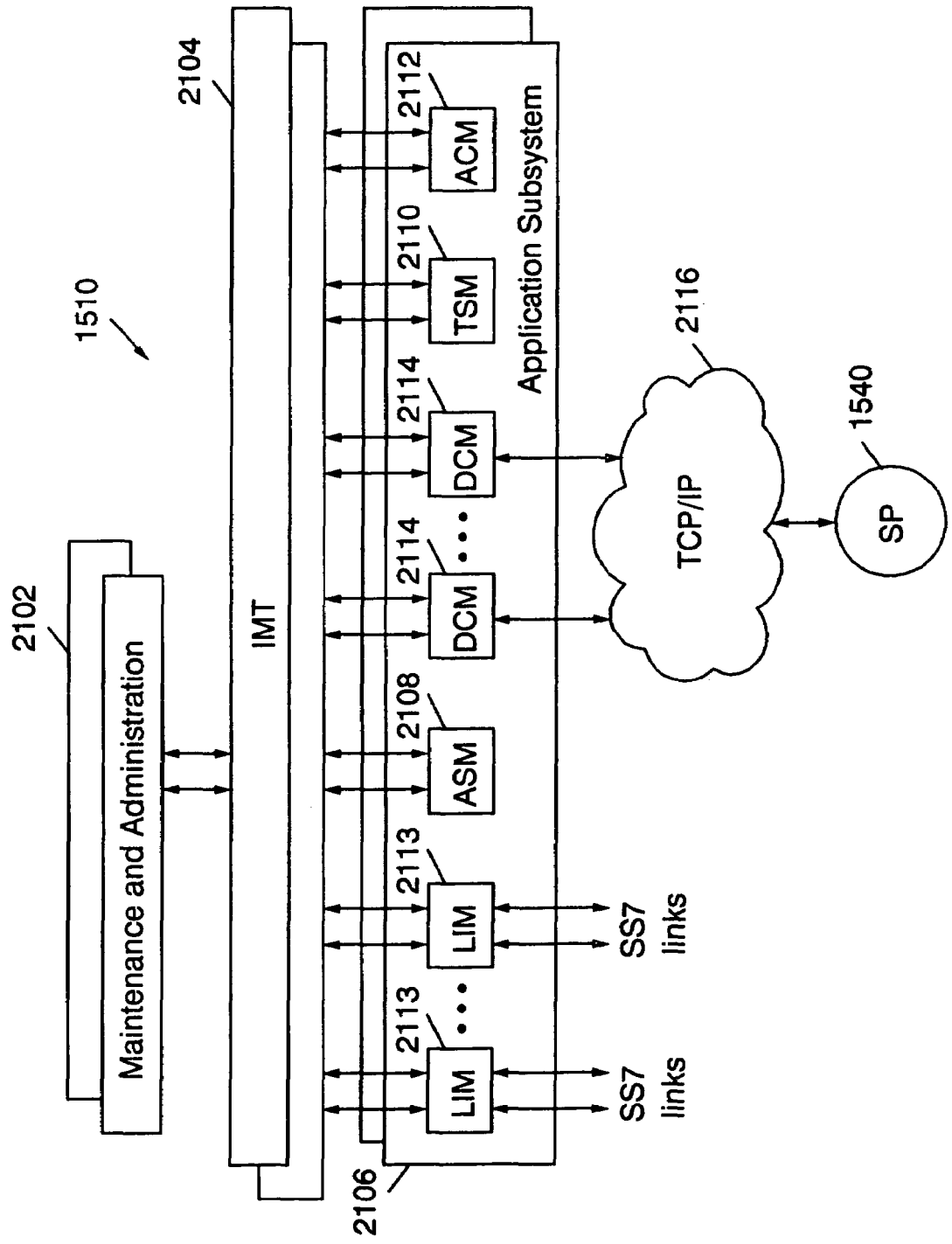
FIG. 21 is a block diagram of exemplary hardware of an STP capable of communicating user part messages over IP networks according to an embodiment of the present invention.

FIG. 21 is a block diagram of a hardware configuration for STP 1510 that includes an integrated SS7/IP user part message communicator according to an embodiment of the present invention. As shown in FIG. 21, STP 1510 includes three cooperating subsystems: maintenance and administration subsystem (MAS) 2102, a communication subsystem comprising a pair of counter rotating interprocessor message transport (IMT) buses 2104, and at least one application subsystem 2106. Application subsystem 2106 can include a plurality of modules. For example, at least one application service module (ASM) 2108 is used to store translation tables and screening data for gateway screening. At least one translation service module (TSM) 2110 that is used for global title translation can be included. At least one application communication module (ACM) 2112 provides unidirectional access to a remote host for STP-LAN functionality. At least one link interface module (LIM) 2113 provides a physical input/output terminal for two SS7 links. Each of the elements 2108–2113 in application subsystem 2106 can include one or more printed circuit cards including processing circuitry and memory devices configured to perform the described functions.

According to an embodiment of the present invention, at least one data communications module (DCM) 2114 provides the necessary hardware for bidirectional communication of SS7 messages over an IP network. DCM 2114 can include a general purpose microprocessor, network communications hardware, program memory, and data memory for bidirectionally communicating SS7 user part messages over an IP network. The SS7/IP user part message communicator 1520 (not shown in FIG. 21) can reside in the program memory of DCM 2114 and cause the processor to perform bidirectional SS7/IP user part communications functions, as will be described in more detail below. DCM 2114 performs bidirectional SS7 to TCP/IP or UDP/IP protocol stack mapping, as previously described. As shown in FIG. 21, each DCM 2114 interfaces with both IMT bus 2104 and an associated TCP/IP network 2116. By interfacing with IMT bus 2104, high speed communications can be obtained with other modules in the STP 1510.

SS7/IP User Part Message Communicator

Figure 22:
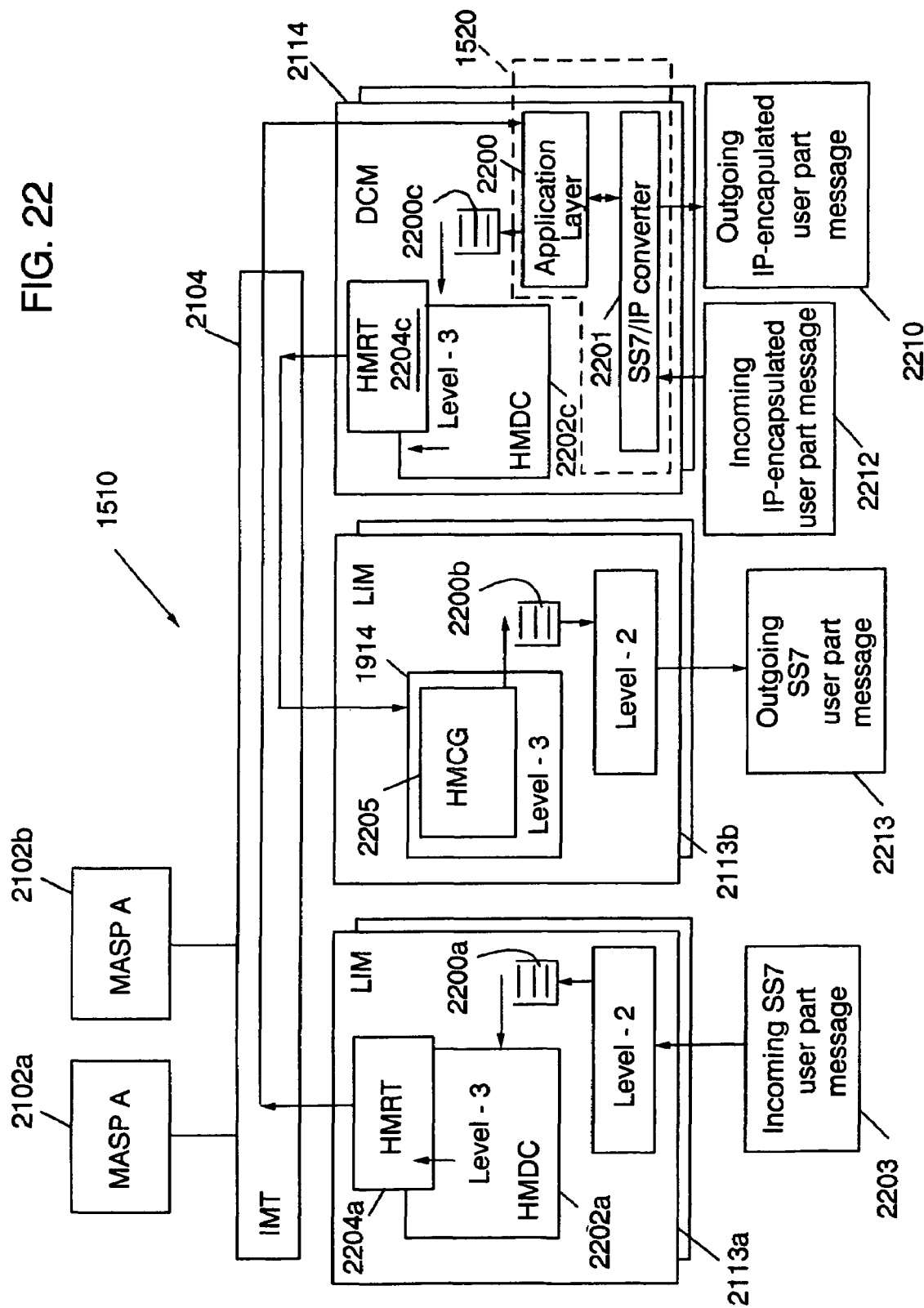
FIG. 22 is a detailed block diagram illustrating exemplary software in an STP for bidirectional SS7 user part message communication over SS7 and IP networks according to an embodiment of the present invention.

FIG. 22 is a detailed block diagram illustrating software executing on the STP 1510 for performing bidirectional SS7/IP user part message communications according to the present invention. In the illustrated embodiment, STP 1510 includes an SS7/IP user part message communicator 1520. SS7/IP user part message communicator 1520 includes application layer 2200 and SS7/IP converter 2201. The functions of application layer 2200 and SS7/IP converter 2201 will be discussed in detail below. The software executing on LIMs 2113a and 2113b and DCM 2114 performs combinations of SS7 functions including message handling discrimination (HMDC) functions, message handling distribution (HMDT) functions, message handling congestion (HMGC) functions and message handling routing (HMRT) functions. As stated above, HMDC functions 2202a and 2202c determine if received MSUs are destined for the STP itself and should be processed at the STP or if the MSUs should be routed through the STP to another SS7 node. HMRT functions 2204a and 2204c determine the signaling link over which the outgoing message is sent. HMGC function 2205 monitors signaling point processing load. Congestion procedures exist to detect when the processing load is too high and perform load shedding to reduce the processing load.

Still referring to FIG. 22, when an incoming SS7 user part message 2203 arrives at LIM 2113a, the SS7 levels 1 and 2 information can be removed and the message is queued in queue 2200a. HMDC function 2202a determines whether routing is required. Determining whether routing is required can include examining the DPC in the message. If HMDC function 2202a determines that routing is required, HMRT 2204a routes the message to DCM 2114 using the IMT bus 2104. Application layer 2200 determines the data components that are passed on to SS7/IP converter 2201. In one embodiment, application layer 2200 might determine that all of the MTP and user part payload data are to be passed on to SS7/IP converter 2201. It should be appreciated that in alternate configurations, application layer 2200 can determine that only certain components of the MTP layer data are needed, and consequently only a portion of the MTP level data would be passed, along with the user part payload, to SS7/IP converter 2201. However, as will be discussed in more detail below, application layer 2200 preferably retains the routing information in the SS7 user part message. In any event, the SS7/IP converter 2201 places the MTP level information and the user part level payload in a TCP or UDP transport layer and adds an IP network layer including an IP address. Additional information, such as application-level sequence numbers and operation codes can also be added to the message. TCP/IP- or UDP/IP-encapsulated message 2210 is then routed to the target SSP via the IP network.

Still continuing with the description of FIG. 22, an incoming TCP/IP- or UDP/IP-encapsulated user part message 2212 is received from an SP via an IP network. The SS7/IP converter 2201 removes the IP network layer and the TCP or UDP transport layer, while any missing MTP layer information is added so as to create a complete SS7 message including an MTP level and a user part level. The message is queued in a queue 2200*c* and processed by HMDC function 2202*c* to determine whether routing is required. If routing is required, HMRT function 2204*c* forwards the message to HMGC function 2205 on LIM 2113*b*. HMCG function 2205 stores the message in a queue 2200*b*. Once the message reaches the head of the queue, outgoing unencapsulated SS7 user part message 2213 is sent to the intended SP via an SS7 link.

Figure 23:
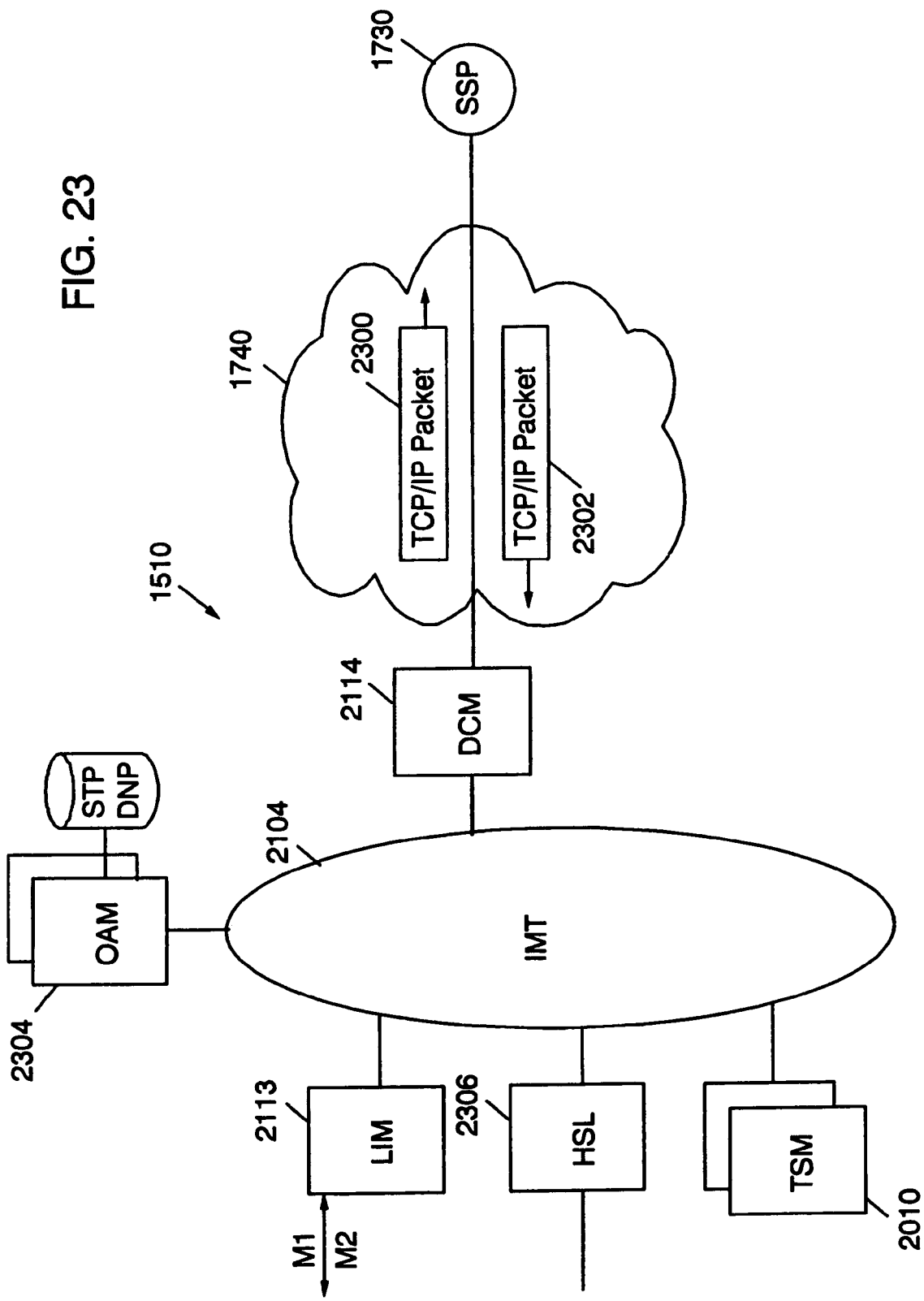
FIG. 23 is a block diagram illustrating exemplary hardware for SS7 to IP message flow according to an embodiment of the present invention.

FIG. 23 is a block diagram illustrating message flow through STP 1510 when processing user part messages sent to and received from SSP 1730 over TCP/IP network 1740 according to an embodiment of the present invention. In FIG. 23, an SS7-formatted user part message (M1) is received by STP 1510 via a conventional SS7 LIM 2113. For the purposes of illustration, it is assumed that the user part message M1 is an initial address message (IAM). Based on information contained in the routing label of the user part message M1, LIM 2113 determines that the IAM message is destined for an SSP 1730 to which STP 1510 is connected via TCP/IP network 1740. LIM 2113 then routes the message M1 internally via IMT bus 2104 to DCM module 2114. DCM module 2114 performs translation and converts SS7 user part message M1 into a TCP/IP packet 2300, wherein some or all of the MTP level 2–3 information and the user part payload layer are transmitted, as described above. TCP/IP packet 2300 is then sent across the TCP/IP network to SSP 1730.

In a second scenario, SSP 1730 generates a TCP/IP packet 2302 containing an SS7 user part message that is routed back to STP 1510. In this case, for the purposes of illustration, it is assumed that the second user part message is an address complete message (ACM). It is also assumed in this example that SSP 1730 generates and transmits the message in TCP/IP packet 2302, which is similar in structure to TCP/IP packet 2300, described above. TCP/IP packet 2302 is passed through TCP/IP network 1740, and eventually received by STP 1510 via the DCM module 2114. TCP/IP packet 2302 is then translated into an SS7 format by DCM 2114 and routed internally over IMT bus 2104 to the appropriate LIM module 2113 and out onto the SS7 network as a user part message M2.

OAM 2304 provides operating, administration and maintenance functionality. This functionality includes user I/O, disk services, database updates to active cards and the general ability to load the resident software on the LIMs, ASMs, etc. HSL 2306 is a high speed signaling link implemented according to the Bellcore GR-2878-core specification. This high speed link is an SS7 link that operates on ATM over T1 as opposed to MTP over DS0 physical network. The following table illustrates OSI standard layers and compares MTP Low Speed Links, MTP High Speed Links, traditional IP and operation of a DCM according to an embodiment of the present invention.

TABLE 1

Comparison of OSI Layers, MTP Low and High Speed Links, IP Layers, and DCM Functionality

| OSI (Standard) | MTP Low Speed Links | MTP High Speed Links | IP (Traditional) | DCM |
|---|---|---|---|---|
| Application | ISUP | ISUP | — | ISUP |
| Presentation | — | — | — | — |
| Session | — | — | — | — |
| Transport | — | — | TCP | — |
| Network | MTP 3 | MTP 3 | IP | MTP 3 |
| Data link | MTP-2 | SAAL AAL-5 | MAC | Gateway Adaptation Layer TCP IP MAC |
| Physical | DS0 | T1 | 10/100 base-t | 10/100 base-t |

Data Structures

Figure 24:
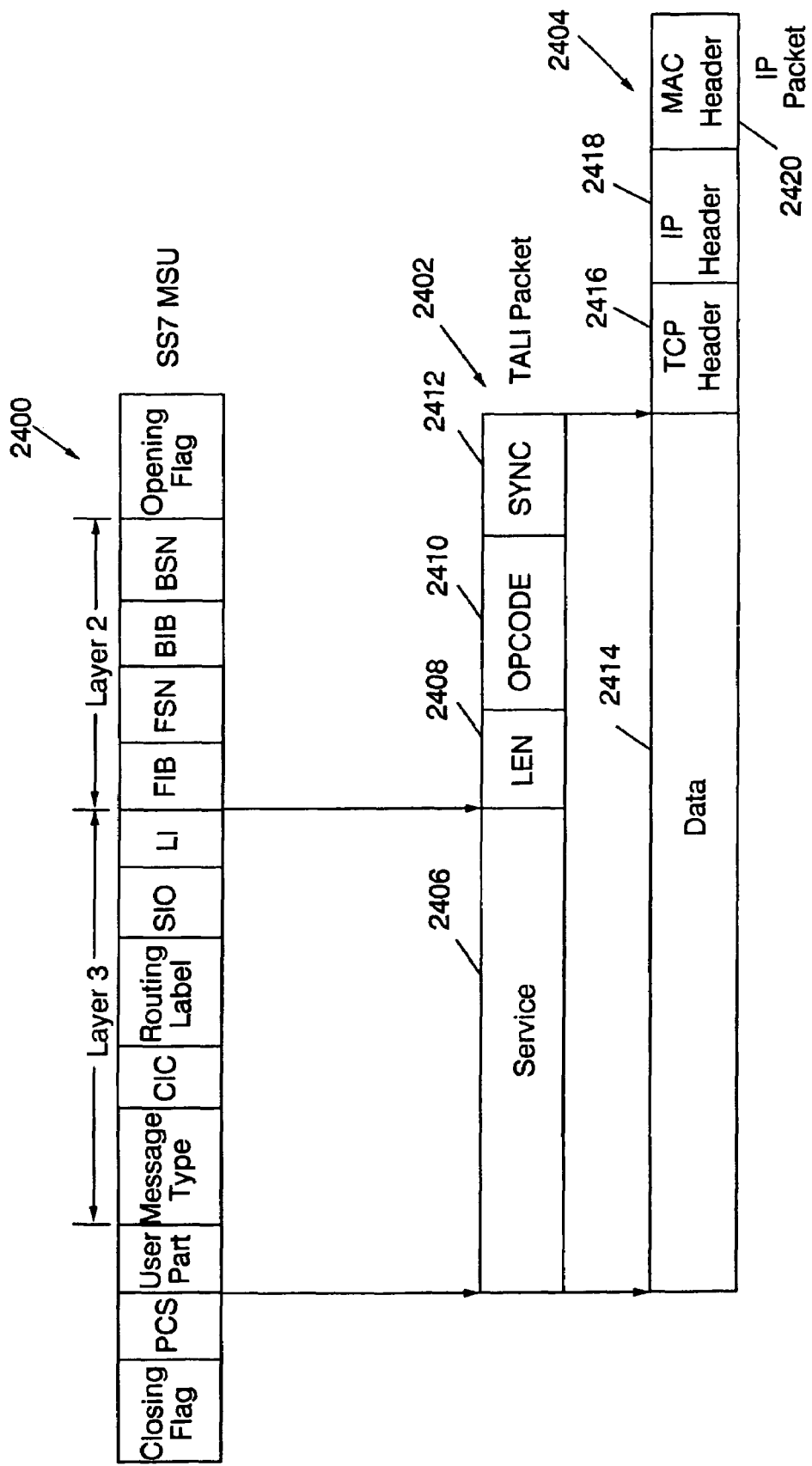
FIG. 24 is a block diagram of an exemplary data structure for transmitting SS7 user part messages over IP networks according to an embodiment of the present invention.

FIG. 24 illustrates a data structure for bidirectionally communicating SS7 user part messages in internet protocol packets according to an embodiment of the present invention. In FIG. 24, SS7 MSU generally designated 2400 is encapsulated in transport adapter layer interface (TALI) packet generally designated 2402, which is in turn encapsulated in IP packet 2404. More particularly, the layer 3 information in SS7 MSU 2400, including the message type field, the circuit information code field, the routing label, and the service information octet are encapsulated in service field 2406 of TALI packet 2402. The user part field is also encapsulated in service field 2406. The remaining portions of the SS7 MSU are preferably discarded. TALI packet 2402, in addition to the SS7 layer 3 information, includes length field 2408, opcode field 2410, and synchronization field 2412. Length field 2408 specifies the length of the data in service field 2406 of TALI packet 2402. Opcode field 2410 specifies an SS7 message type. In this example, the opcode field would specify an SS7 user part message type such as ISUP, TUP, or BISUP. Sync field 2412 indicates the start of a packet. Sync field 2412 is useful in determining packet boundaries in TCP streams if the value in the length field 2408 is incorrect.

TALI packet 2402 is encapsulated in data field 2414 of IP packet 2404. TCP header field 2416 includes TCP header information, such as TCP port numbers, for bidirectional user part message communication. IP header field 2418 includes IP header information such as source and destination IP addresses, for IP packet 2404. Finally, MAC header field 2420 includes physical and network information for delivering the IP packet 2404 over a physical network.

Figure 25:
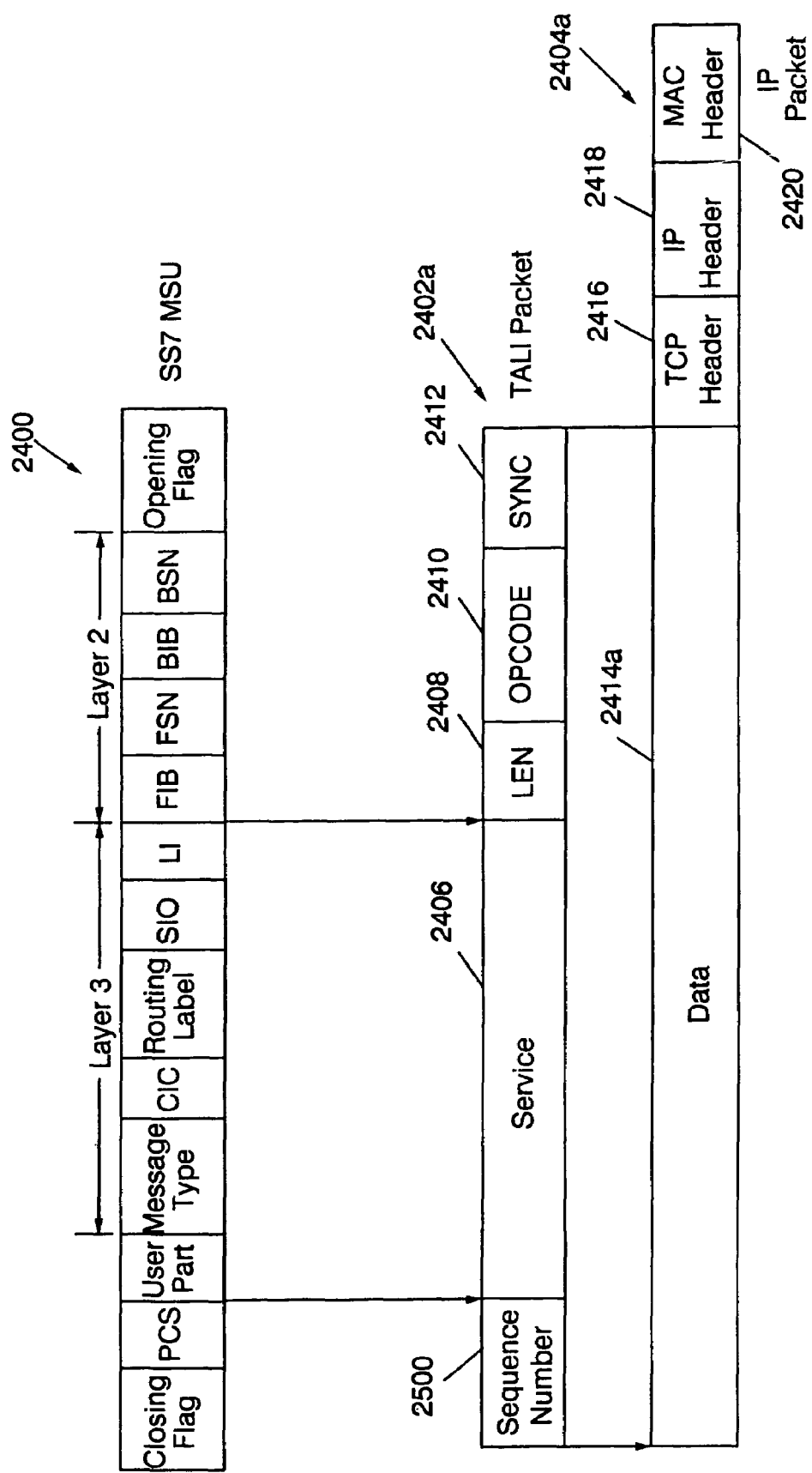
FIG. 25 is a block diagram of another exemplary data structure for transmitting SS7 user part messages over IP networks according to an embodiment of the present invention.

FIG. 25 illustrates an alternative data structure for encapsulating an SS7 user part message in an IP packet according to an embodiment of the present invention. The data structure illustrated in FIG. 25 provides increased reliability using message sequencing and retrieval. In FIG. 25, SS7 MSU 2400 is the same as the SS7 MSU illustrated in FIG. 24. TALI packet generally designated 2402*a* however, is different from TALI packet 2402 illustrated in FIG. 24. In particular, TALI packet 2402*a* includes an application-level sequence number field 2500 for sequencing IP packets between SS7 nodes. In the illustrated embodiment, application-level sequence number field 2500 is included as a trailer to TALI packet 2402*a*. In an alternative embodiment, application-level sequence number field 2500 can be included as a header to TALI packet 2402*a* or at any other location in TALI packet 2402*a*. Application-level sequence number field 2500 provides a sequence number of a TALI packet in a communication between SS7 nodes. Processing the sequence number value to provide increased reliability will be discussed in more detail below.

IP packet 2404*a* includes data field 2414*a* that includes TALI packet 2402*a*. Data field 2414*a* thus includes application-level sequence number field 2500. The remaining fields in IP packet 2404*a* are the same as those illustrated in FIG. 24 and need not be further described.

Figure 26:
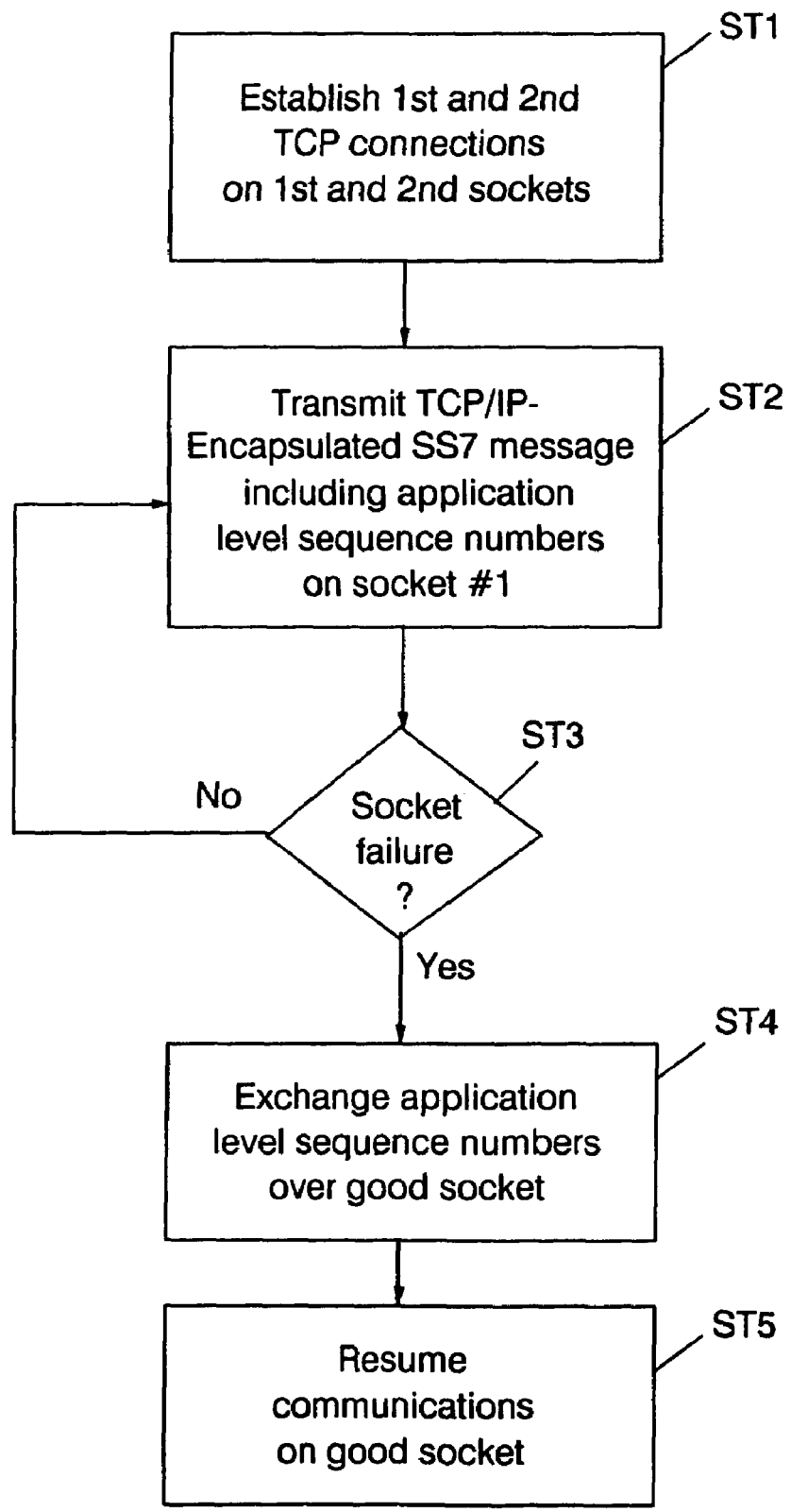
FIG. 26 is a flow chart illustrating an exemplary SS7 message recovery routine according to an embodiment of the present invention.

FIG. 26 illustrates an exemplary SS7 message recovery routine for reliable communication of IP-encapsulated SS7 messages between SS7 nodes. The SS7 message recovery routine can be software executed by SS7 communication hardware in SS7 nodes. For example, the SS7 message recovery routine can be executed by a DCM or its equivalent in an STP. Alternatively, the SS7 message recovery routine can be executed by other nodes, such as SSPs, SCPs, or non-SS7 IP nodes for reliable IP communications. In FIG. 26, the SS7 packet recovery routine is explained generally in terms of steps performed by two SS7 nodes. The nodes are referred to as node A and node B, respectively. It will be understood by those of ordinary skill in the art that either node could be an STP, an SSP, an SCP or other node.

In step ST1, node A establishes first and second TCP connections on first and second TCP sockets with node B. In step ST2, node A transmits TCP/IP-encapsulated SS7 messages including application-level sequence numbers indicating the sequence of the packets on the first socket to node B. In step ST3, node A determines whether a socket failure has occurred. If a socket failure has not occurred, node A continues to transmit TCP packets to node B on socket number 1. Since TCP communications are bidirectional, node B can also transmit TCP packets to node A on socket number 1. The packets transmitted from node B to node A preferably also include application-level sequence numbers indicating the order of packets transmitted from node B to node A.

In step ST4, if a socket failure has occurred, for example on socket number 1, nodes A and B exchange application-level sequence numbers over the good socket for the last packets transmitted and received. For example, node A transmits the application-level sequence number of the last packet received from node B to node B. Node B transmits the application-level sequence number of the last packet transmitted to node A. Similarly, node B transmits the application-level sequence number indicating the last packet received from node A to node A. Node B transmits the application-level sequence number indicating the last packet transmitted to node A. In step ST5, node A and node B resume data communications on the good socket, i.e., socket 2 based on the application-level sequence numbers. For example, node B can transmit lost packets to node A, and node A can transmit the lost packets to node B on the second socket. In this manner, reliable communications are established between SS7 nodes even when a socket fails. Conventional TCP sequence numbering does not address this issue because TCP does not provide a mechanism for packet retrieval when a socket fails. The application-level sequence numbering of the present invention allows communications to resume at the point where communications were lost, rather than requiring retransmission of an entire sequence of packets.

Although the invention has thus far been described in detail with respect to replacing SS7 links between an STP and other SS7 type SP network elements with TCP/IP links, the present invention can also be employed to facilitate communication between SS7 network elements and IP based network elements via TCP/IP links. Furthermore, the discussion and examples provided above specifically relate the use of the present invention to SS7 user part messages. However, it will be appreciated by those skilled in the art that any SS7 message type that requires MTP routing label information in order to effectively perform or serve its proper function can be communicated bidirectionally between SS7 and IP networks using the STP of the present invention.

It will be understood that various details of the invention can be changed without departing from the scope of the invention. Furthermore, the foregoing description is for the purpose of illustration only, and not for the purpose of limitation—the invention being defined by the claims.

What is claimed is:

1. A method for transmitting signaling system seven (SS7) user part messages between SS7 signaling points comprising:
   - (a) receiving, at a first signal transfer point (STP) configured to perform SS7 message transfer part layer 3 routing and global title translation, a first SS7 user part message sent from a first SS7 signaling point over an SS7 signaling link;
   - (b) at the first signal transfer point encapsulating the first SS7 user part message in a first internet protocol (IP) packet, wherein encapsulating the first SS7 user part message in a first IP packet includes excluding at least SS7 layer 2 information in the first SS7 user part message from the first IP packet; and
   - (c) from the first signal transfer point, transmitting the first IP packet to a node over an IP network.

2. The method of claim 1 wherein encapsulating the first SS7 user part message in a first IP packet includes adding a transmission control protocol (TCP) header to the first SS7 user part message.

3. The method of claim 1 wherein encapsulating the first SS7 user part message in a first IP packet includes adding a user datagram protocol (UDP) header to the first SS7 user part message.

4. The method of claim 1 wherein encapsulating the first SS7 user part message in a first IP packet includes adding an application-level sequence number to the first SS7 user part message.

5. The method of claim 1 wherein transmitting the first IP packet to a node includes transmitting the first IP packet without terminating user part layer communications.

6. The method of claim 1 wherein transmitting the first IP packet to a node over an IP network comprises transmitting the IP packet to a local service switching point (SSP), and the IP network thereby functions as an SS7 A link between the first STP and the SSP.

7. The method of claim 1 wherein transmitting the first IP packet to a node over an IP network comprises transmitting the IP packet to a second STP of the same hierarchical level as the first STP, and the IP network thereby replaces an SS7 B link between the first and second STPs.

8. The method of claim 1 wherein transmitting the first IP packet to a node over an IP network comprises transmitting the IP packet to a second STP, the first and second STPs comprising a mated pair of STPs, and the IP network thereby functions as an SS7 C link between the first and second STPs.

9. The method of claim 1 wherein transmitting the first IP packet to a node over an IP network comprises transmitting the IP packet to a second STP of a different hierarchical level than the first STP, and the IP network thereby functions as an SS7 D link between the first and second STPs.

10. The method of claim 1 transmitting the first IP packet to a node over an IP network comprises transmitting the IP packet to a service switching point (SSP) located in a different local area from the first STP, and the IP network thereby functions as an SS7 E link between the first STP and the SSP.

11. The method of claim 1 wherein the first SS7 user part message comprises an ISDN user part message.

12. The method of claim 1 wherein receiving a first SS7 user part message includes intercepting a first SS7 user part message addressed to an SS7 point code of the node, wherein encapsulating the first SS7 user part message in a first IP packet includes inserting a destination IP address corresponding to the node in the IP packet, and wherein the node comprises a destination end office for a call associated with the first SS7 user part message.

13. The method of claim 1 wherein the first SS7 user part message comprises an ISDN user part (ISUP) initial address message.

14. The method of claim 1 wherein encapsulating the first SS7 user part message in the first IP packet includes inserting a destination IP address in the first IP packet, the destination IP address corresponding to the node, and inserting a source IP address in the first IP packet, the source IP address corresponding to the signal transfer point.

15. The method of claim 1 wherein encapsulating the first SS7 user part message in the first IP packet includes retaining SS7 routing information in the first SS7 user part message.

16. A signaling system seven/internet protocol (SS7/IP) user part message communicator comprising computer-executable instructions embodied in a computer-readable medium for performing steps comprising:
  (a) receiving, at a first signal transfer point (STP) configured to perform SS7 message transfer part layer 3 routing and global title translation, a first SS7 user part message sent from a first SS7 signaling point over an SS7 signaling link;
  (b) at the first signal transfer point, encapsulating the first SS7 user part message in a first IP packet, wherein encapsulating the first SS7 user part message in a first IP packet includes excluding at least SS7 layer 2 information in the first SS7 user part message from the first IP Packet; and
  (c) from the first signal transfer point, transmitting the first IP packet to a node over an IP network.

17. The SS7/IP user part message communicator of claim 16 wherein encapsulating the first SS7 user part message in a first IP packet includes adding a transmission control protocol (TCP) header to the first SS7 user part message.

18. The SS7/IP user part message communicator of claim 16 wherein encapsulating the first SS7 user part message in a first IP packet includes adding a user datagram protocol (UDP) header to the first SS7 user part message.

19. The SS7/IP user part message communicator of claim 16 wherein encapsulating the first SS7 user part message in a first IP packet includes adding an application-level sequence number to the first SS7 user part message.

20. The SS7/IP user part message communicator of claim 16 wherein transmitting the first IP packet to a second SS7 signaling point includes transmitting the first IP packet without terminating user part layer communications.

21. The SS7/IP user part message communicator of claim 16 wherein transmitting the first IP packet to a node over an IP network comprises transmitting the IP packet to a service switching point (SSP), and the IP network thereby functions as an SS7 A link between the first STP and the SSP.

22. The SS7/IP user part message communicator of claim 16 wherein transmitting the first IP packet to a node over an IP network comprises transmitting the IP packet to a second STP of the same hierarchical level as the first STP, and the IP network thereby replaces an SS7 B link between the first and second STPs.

23. The SS7/IP user part message communicator of claim 16 wherein transmitting the first IP packet to a node over an IP network comprises transmitting the IP packet to a second STP, the first and second STPs comprising a mated pair of STPs, and the IP network thereby functions as an SS7 C link between the first and second STPs.

24. The SS7/IP user part message communicator of claim 16 wherein transmitting the first IP packet to a node over an IP network comprises transmitting the IP packet to a second STP of a different hierarchical level than the first STP, and the IP network thereby functions as an SS7 D link between the first and second STPs.

25. The SS7/IP user part message communicator of claim 16 wherein transmitting the first IP packet to a node over an IP network comprises transmitting the IP packet to a service switching point (SSP) located in a different local area from the first STP, and the IP network thereby functions as an SS7 E link between the first STP and SSP.

26. The SS7/IP user part message communicator of claim 16 wherein the first SS7 user part message comprises an ISDN user part message.

27. The SS7/IP user part message communicator of claim 16 wherein receiving a first SS7 user part message includes intercepting a first SS7 user part message addressed to an SS7 point code of the node, wherein encapsulating the first SS7 user part message in a first IP packet includes inserting a destination IP address corresponding to the node in the IP packet, and wherein the node comprises a destination end office for a call associated with the first SS7 user part message.

28. The SS7/IP user part message communicator of claim 16 wherein the first SS7 user part message comprises an ISDN user part (ISUP) initial address message.

29. The SS7/IP user part message communicator of claim 16 wherein encapsulating the first SS7 user part message in the first IP packet includes inserting a destination IP address in the first IP packet, the destination IP address corresponding to the node, and inserting a source IP address in the first IP packet, the source IP address corresponding to the signal transfer point.

30. The SS7/IP user part message communicator of claim 16 wherein encapsulating the first SS7 user part message in the first IP packet includes retaining SS7 routing information in the first SS7 user part message.

31. A method for transmitting signaling system seven (SS7) user part messages between SS7 signaling points comprising:
  (a) receiving, at a first signal transfer point (STP), a first SS7 user part message sent from a first SS7 signaling point over an SS7 signaling link, wherein receiving the first SS7 user part message at the first STP includes receiving the first SS7 user part message at an SS7 link interface module within the first STP, wherein the first STP includes a distributed internal processing architecture including at least one SS7 link interface module for sending and receiving SS7 signaling messages over SS7 signaling links, at least one data communications module for sending and receiving SS7 user part messages over IP signaling links and for extracting SS7 user part messages from inbound IP messages, and a bus for interconnecting the link interface module and the data communications module and wherein the link interface module and the data communications module each include an SS7 message MTP level 3 routing function for routing SS7 user part messages to a module in the first STP associated with outbound signaling links for the SS7 user part messages;

(b) at the first signal transfer point, encapsulating the first SS7 user part message in a first internet protocol (IP) packet; and (c) from the first signal transfer point, transmitting the first IP packet to a node over an IP network.

32. The method of claim 31 comprising, at the link interface module, determining that the first SS7 user part message should be routed to an IP node and forwarding the first SS7 user part message to the data communications module via the bus.

33. The method of claim 32 wherein encapsulating the SS7 user part message in a first IP packet includes receiving the first SS7 user part message at the data communications module and encapsulating the first SS7 user part message in an IP packet addressed to the node.

34. A signaling system seven/internet protocol (SS7/IP) user part message communicator comprising computer-executable instructions embodied in a computer-readable medium for performing steps comprising:

(a) receiving, at a first signal transfer point (STP), a first SS7 user part message sent from a first SS7 signaling point over an SS7 signaling link, wherein receiving the first SS7 user part message at the first STP includes receiving the first SS7 user part message at an SS7 link interface module within the first STP, wherein the first STP includes a distributed internal processing architecture including at least one SS7 link Interface module for sending and receiving SS7 user part messages over IP signaling links and for extracting SS7 user part messages from inbound IP messages, at least one data communications module for communicating signaling messages over IP signaling links, and a bus for interconnecting the link interface module and the data communication module and wherein the link interface module and the data communications module each include an SS7 MTP level 3 routing function for routing SS7 user part messages to a module in the first STP associated with outbound signaling links for the SS7 user part messages;

(b) at the first signal transfer point, encapsulating the first SS7 user part message in a first IP packet; and (c) from the first signal transfer point, transmitting the first IP packet to a node over an IP network.

35. The SS7/IP user part message communicator of claim 34 comprising, at the link interface module, determining that the first SS7 user part message should be routed to an IP node and forwarding the first SS7 user part message to the data communications module via the bus.

36. The SS7/IP user part message communicator of claim 35 wherein encapsulating the SS7 user part message in a first IP packet includes receiving the first SS7 user part message at the data communications module and encapsulating the first SS7/IP user part message in an IP packet addressed to the node.

\* \* \* \* \*

UNITED STATES PATENT AND TRADEMARK OFFICE
CERTIFICATE OF CORRECTION

PATENT NO. : 7,050,456 B1
APPLICATION NO. : 09/443712
DATED : May 23, 2006
INVENTOR(S) : David M. Sprague et al.

It is certified that error appears in the above-identified patent and that said Letters Patent is hereby corrected as shown below:

On title page, item 75 Inventors
replace "Venkatarmaiah Ravishankar"
with --Venkataramaiah Ravishankar--.

Signed and Sealed this

Twenty-second Day of August, 2006

JON W. DUDAS
*Director of the United States Patent and Trademark Office*